United States Patent
Lovley, II et al.

(10) Patent No.: US 9,168,965 B2
(45) Date of Patent: Oct. 27, 2015

(54) ELECTRIC SCOOTER ASSEMBLIES

(71) Applicant: Bravo Sports, Santa Fe Springs, CA (US)

(72) Inventors: Jack B. Lovley, II, Lake Forest, CA (US); Joseph C. Klingl, Los Angeles, CA (US); Mark Groenhuyzen, Huntington Beach, CA (US); Kenneth Edlauer, Newbury Park, CA (US)

(73) Assignee: BRAVO SPORTS, Santa Fe Springs, CA (US)

( * ) Notice: Subject to any disclaimer, the term of this patent is extended or adjusted under 35 U.S.C. 154(b) by 0 days.

(21) Appl. No.: 14/043,748

(22) Filed: Oct. 1, 2013

(65) Prior Publication Data

US 2014/0090916 A1   Apr. 3, 2014

Related U.S. Application Data

(60) Provisional application No. 61/708,996, filed on Oct. 2, 2012.

(51) Int. Cl.
*B62M 6/60*   (2010.01)
*B62K 3/00*   (2006.01)
*B62M 7/12*   (2006.01)

(52) U.S. Cl.
CPC ............ *B62K 3/002* (2013.01); *B62K 2202/00* (2013.01); *B62K 2204/00* (2013.01); *B62M 6/60* (2013.01); *B62M 7/12* (2013.01)

(58) Field of Classification Search
CPC ...... B62M 7/12; B62M 6/60; B62K 2202/00; B62K 2204/00
USPC ............ 180/220, 208, 206.1, 207.3, 68.5
See application file for complete search history.

(56) References Cited

U.S. PATENT DOCUMENTS 5,950,498 A  *  9/1999  Gossett et al. .............. 74/551.8
6,382,366 B1    5/2002  Chang
6,752,229 B2 *  6/2004  Ho ............................... 180/181

(Continued)

FOREIGN PATENT DOCUMENTS

CN        102050182 A    5/2011

OTHER PUBLICATIONS

International Search Report; Application No. PCT/US2013/062931; Filed Oct. 1, 2013.

(Continued)

*Primary Examiner* — Joseph Rocca
*Assistant Examiner* — Marlon Arce
(74) *Attorney, Agent, or Firm* — Knobbe, Martens, Olson & Bear LLP

(57) ABSTRACT

In some embodiments, an electric scooter comprises a deck configured to support a rider, front and rear wheels, a handlebar assembly that includes a handlebar, a left handle, and a right handle, a steering column that includes a steering tube and the handlebar assembly, and an electric motor configured to provide mechanical power to at least one of the front and the rear wheels. One or more of the steering column, steering tube, handlebar assembly, handlebar, left handle, right handle, and deck can be configured to be detachable and comprise one or more rechargeable battery packs. In addition, one or more of the steering column, steering tube, handlebar assembly, handlebar, left handle, right handle, and deck can be configured to receive one or more removable rechargeable batteries.

7 Claims, 39 Drawing Sheets

(56) References Cited

U.S. PATENT DOCUMENTS

| | | | |
|---|---|---|---|
| 7,267,352 B2* | 9/2007 | Ishikawa | 280/288.4 |
| D581,991 S | 12/2008 | Armand et al. | |
| 8,162,090 B2* | 4/2012 | Atherton et al. | 180/208 |
| 8,167,074 B1* | 5/2012 | Tsiyoni | 180/214 |
| 8,613,458 B2 | 12/2013 | Ghisolfi et al. | |
| 8,662,508 B2 | 3/2014 | Grossman | |
| 2002/0117825 A1 | 8/2002 | Ho | |
| 2004/0026144 A1* | 2/2004 | Lan | 180/180 |
| 2004/0079571 A1* | 4/2004 | Laver et al. | 180/180 |
| 2005/0092538 A1* | 5/2005 | Baldwin et al. | 180/220 |
| 2006/0266570 A1 | 11/2006 | Roth et al. | |
| 2008/0203691 A1 | 8/2008 | Hsu | |
| 2009/0200768 A1 | 8/2009 | Armand et al. | |
| 2011/0031711 A1 | 2/2011 | Grossman | |
| 2011/0056177 A1* | 3/2011 | Goto | 56/14.7 |
| 2011/0068554 A1 | 3/2011 | Armand et al. | |
| 2013/0269473 A1* | 10/2013 | Ierfone | 74/551.8 |
| 2014/0175768 A1* | 6/2014 | Talavasek et al. | 280/202 |

OTHER PUBLICATIONS

Office Action U.S. Appl. No. 14/043,625, filed Oct. 1, 2013; Dated Jul. 17, 2014.

* cited by examiner

ELECTRIC SCOOTER ASSEMBLIES

RELATED APPLICATION

This application claims the benefit of U.S. Provisional Patent Application No. 61/708,996, filed Oct. 2, 2012, the entire contents of which are incorporated herein by reference.

BACKGROUND

Field of the Invention

The inventions disclosed herein relate generally to scooter assemblies.

SUMMARY

In some embodiments, an electric scooter comprises a deck configured to support a rider; a front wheel and a rear wheel; a handlebar assembly comprising a handlebar, a left handle, and a right handle; a steering column comprising a steering tube and the handlebar assembly, the steering column configured to steer the scooter by controlling a direction of the front wheel; and an electric motor configured to provide mechanical power to at least one of the front and the rear wheels; wherein one or more of the steering column, steering tube, handlebar assembly, handlebar, left handle, right handle, and deck are configured to be detachable and comprise one or more rechargeable battery packs, the one or more rechargeable battery packs configured to power the electric motor.

In some embodiments, an electric scooter comprises a deck configured to support a rider; a front wheel and a rear wheel; a handlebar assembly comprising a handlebar, a left handle, and a right handle; a steering column comprising a steering tube and the handlebar assembly, the steering column configured to steer the scooter by controlling a direction of the front wheel; and an electric motor configured to provide mechanical power to at least one of the front and the rear wheels; wherein at least one of the steering column, steering tube, handlebar assembly, handlebar, left handle, right handle, and deck are configured to receive one or more removable batteries, the one or more removable batteries configured to power the electric motor.

In some embodiments, a method of operating an electric scooter comprises detaching from the electric scooter at least one of a steering column, a steering tube, a handlebar assembly, a handlebar, a left handle, a right handle, and a deck; and reattaching a charged at least one of the steering column, steering tube, handlebar assembly, handlebar, left handle, right handle, and deck to the electric scooter.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

For the purpose of understanding particular embodiments, reference will be made to the drawings.

FIGS. 1-11 generally relate to embodiments related to scooters comprising a deck, front and rear wheels, and a foot brake, wherein the foot brake is in proximity to the rear of the deck and can apply a braking force to the rear wheel. FIGS. 1-11 also generally relate to embodiments related electric scooters comprising a frame comprising tubular members, wherein batteries can be located within the tubular members.

Figure 1:
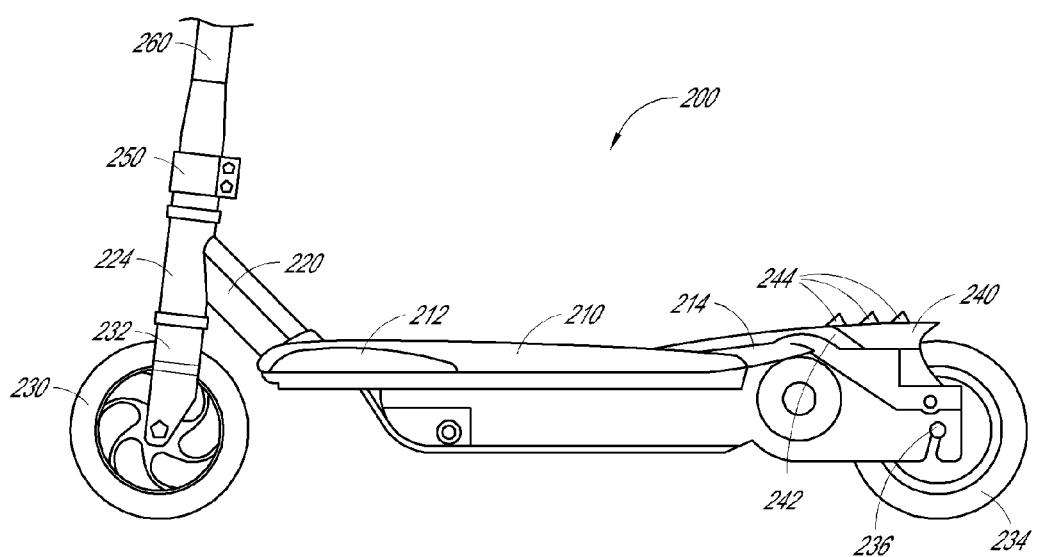
FIG. 1 a right side view of a portion of an embodiment of a scooter assembly.

FIG. 1 shows a side view of an embodiment of a scooter assembly 200 that comprises a deck 210, a neck 220, a head tube 224, a clamp assembly 250, a steering tube 260, a front wheel 230, a rear wheel 234, and a foot brake 240. In some embodiments, the scooter assembly 200 can be an electric scooter. The neck 220 can be joined to the deck 210 at or near a front end 212 of the deck 210. The deck 210 is a component of the scooter assembly 200 on which a rider can stand during use. The neck 220 can serve to connect the deck 210 to the front wheel and the handlebar assemblies. In some embodiments, the neck 220 can be coupled to the deck 210. In addition, the head tube 224 can be fixedly attached to the neck 220. The neck 220 and head tube 224 can be may be made of various metals, plastic, carbon fiber, or other materials that impart sufficient structural strength. The steering tube 260 can extend through the head tube 224 and be rotatable relative thereto. At a top portion of the steering tube 260 a handlebar assembly (not shown) can be attached. The handlebar assembly can comprise a left handle and a right handle for the rider to grip and steer the scooter 200. Turning the handlebar assembly can cause the steering tube 260 to turn the front wheel 230. A front fork 232 can be coupled to a bottom portion of the steering tube 260 and can rotatably support the front wheel 230. The rear wheel 234 can be a fixed position wheel. The rear wheel 234 can be configured to rotate about a rear-wheel axle 236.

The foot brake 240 can be attached in proximity to a rear portion 214 of the deck 210. The foot brake 240 can comprise a plurality of ridges 244 to enhance traction of the foot brake 240 and facilitate location of the foot brake 240 by a rider. In preferred embodiments, the foot brake 240 can comprise plastic. In other embodiments, the foot brake 240 can comprise metals, carbon fiber, or any other suitable material. The foot brake 240 can be configured to pivot about a pivot axis 242. By pivoting downward, the foot brake 240 can provide a braking pressure to the rear wheel 234. The foot brake 240 can be biased to return to its natural un-pivoted position after a user has finished applying braking pressure, such as by a biasing member (e.g., a spring).

In some embodiments, the foot brake can be formed as a rear portion of the deck. For example, a rear portion of the deck can be configured to pivot about an axis to provide a braking pressure to the rear wheel.

Figure 2:
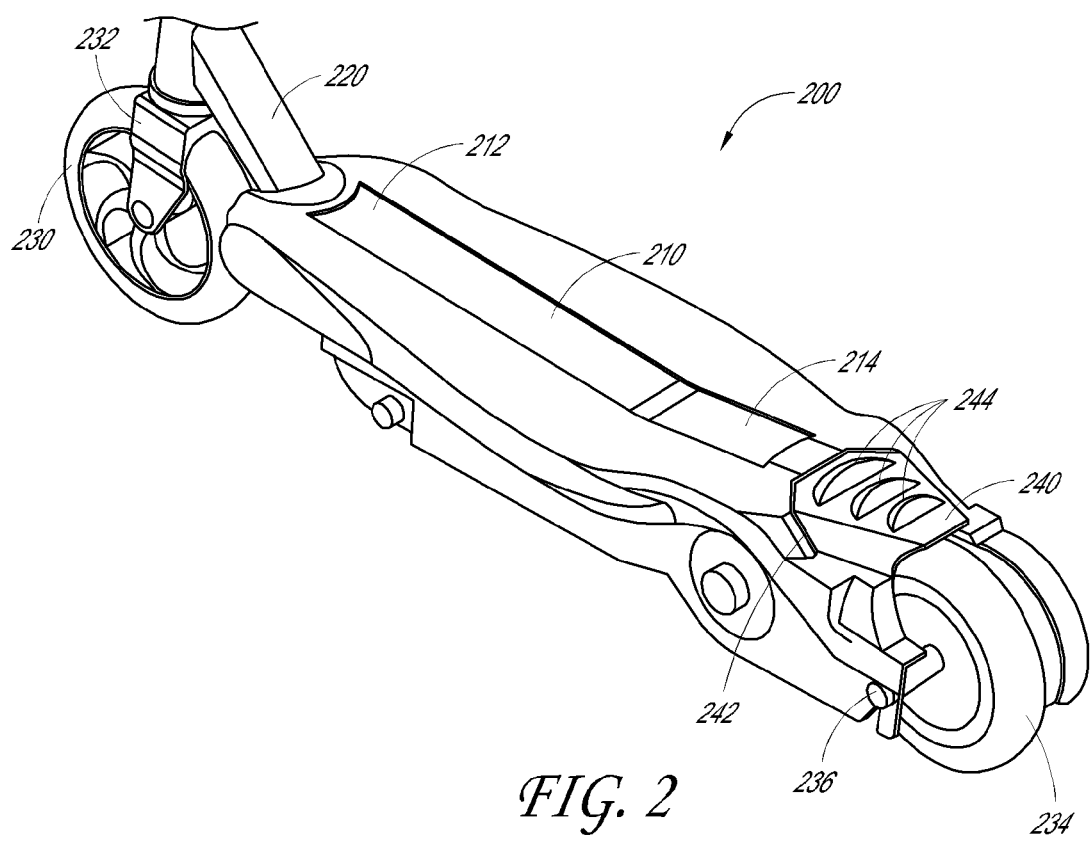
FIG. 2 is a perspective view of another portion of the scooter assembly of FIG. 1.
Figure 9:
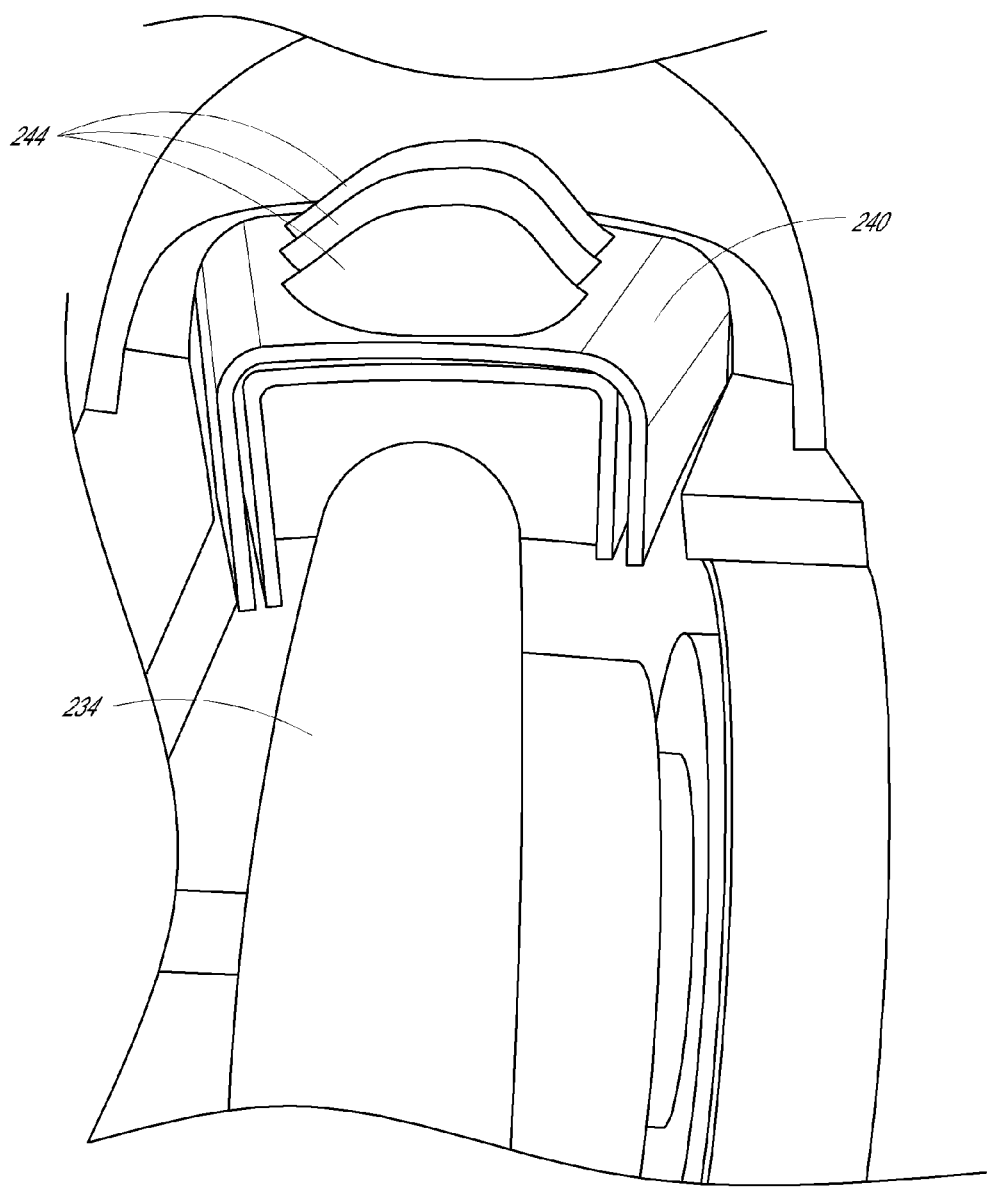
FIG. 9 is another perspective view of a rear portion of the scooter assembly of FIG. 1.
Figure 10:
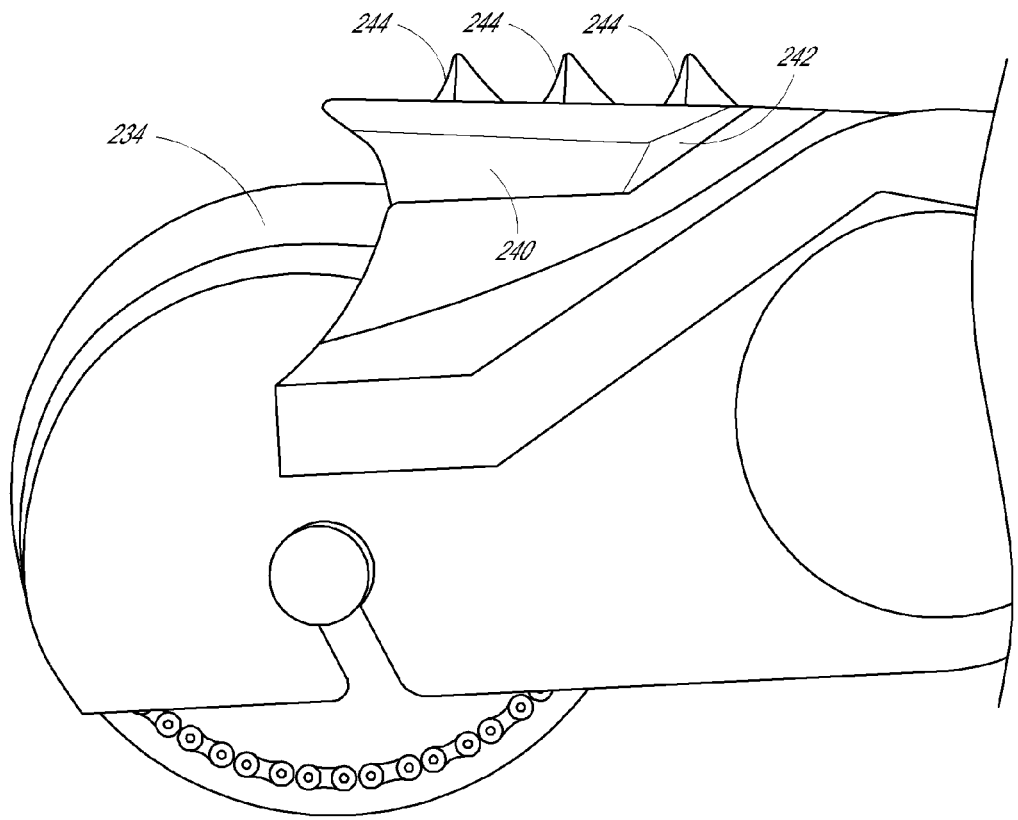
FIG. 10 is a left side view of a rear portion of the scooter assembly of FIG. 1.
Figure 11:
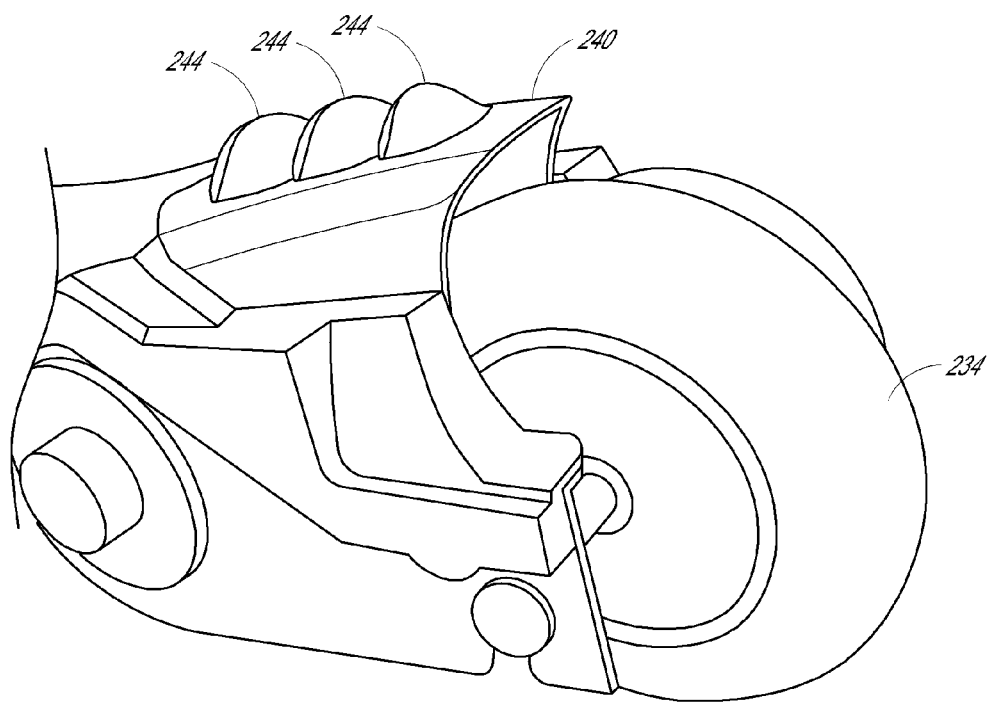
FIG. 11 is another perspective view of a rear portion of the scooter assembly of FIG. 1.

FIG. 2 shows a top perspective view of the scooter assembly 200 that comprises the deck 210, a front deck portion 212, a rear deck portion 214, the front wheel 230, the front fork 232, the rear wheel 234, and the foot brake 240. As discussed, the foot brake 240 can comprise the plurality of ridges 244 to enhance traction of the foot brake 240 and for ease of location of the foot brake 240 for a rider. The foot brake 240 can be configured to pivot about the pivot axis 242. By pivoting downward, the foot brake 240 can provide a braking pressure to the rear wheel 234. With reference to FIGS. 4 and 9, the foot brake 240 can be of a multi-component structure having an inner member (shown in FIG. 4 and visible in FIG. 9) that directly contacts the rear wheel 234 and the outer foot brake member 240 comprising the ridges 244 and visible in FIGS. 1-3 and 6-11. In this manner, the inner member can be constructed of a suitable material, such as a high-friction or long-wearing material (e.g., metal), and the outer foot brake member 240 can be constructed from a material that is easily formed (e.g., to provide the ridges 244) and/or capable of being formed in a desired color (e.g., plastic). Thus, each of the inner and outer member is capable of optimization for its intended purpose.

Figure 3:
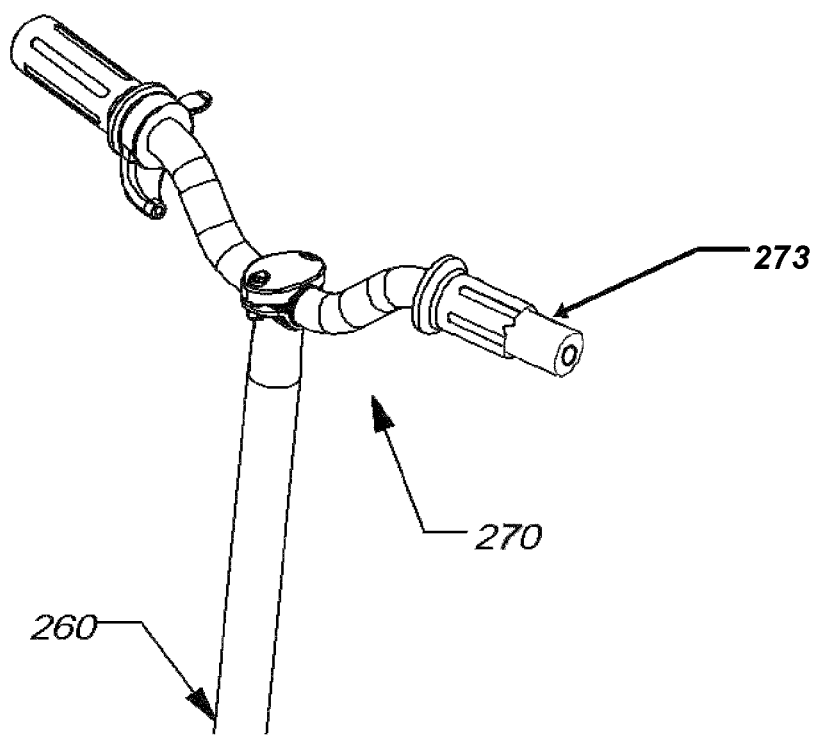
FIG. 3 is a perspective view of a handlebar assembly of the scooter assembly of FIG. 1, with portions of one of the handlebar sections cut-away to show underlying structure.
Figure 4:
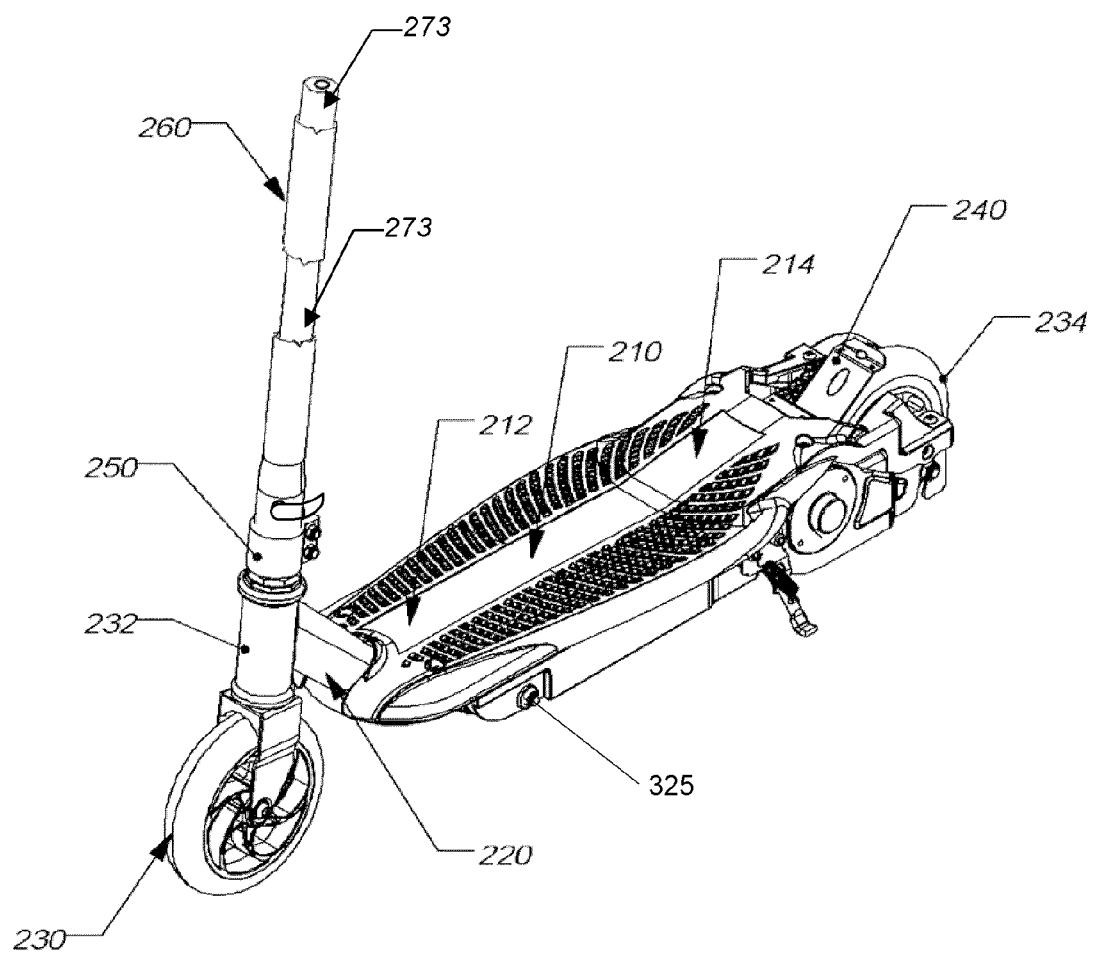
FIG. 4 is a perspective view of another portion of the scooter assembly of FIG. 1, with portions of a steering column cut away to reveal underlying structure.
Figure 5:
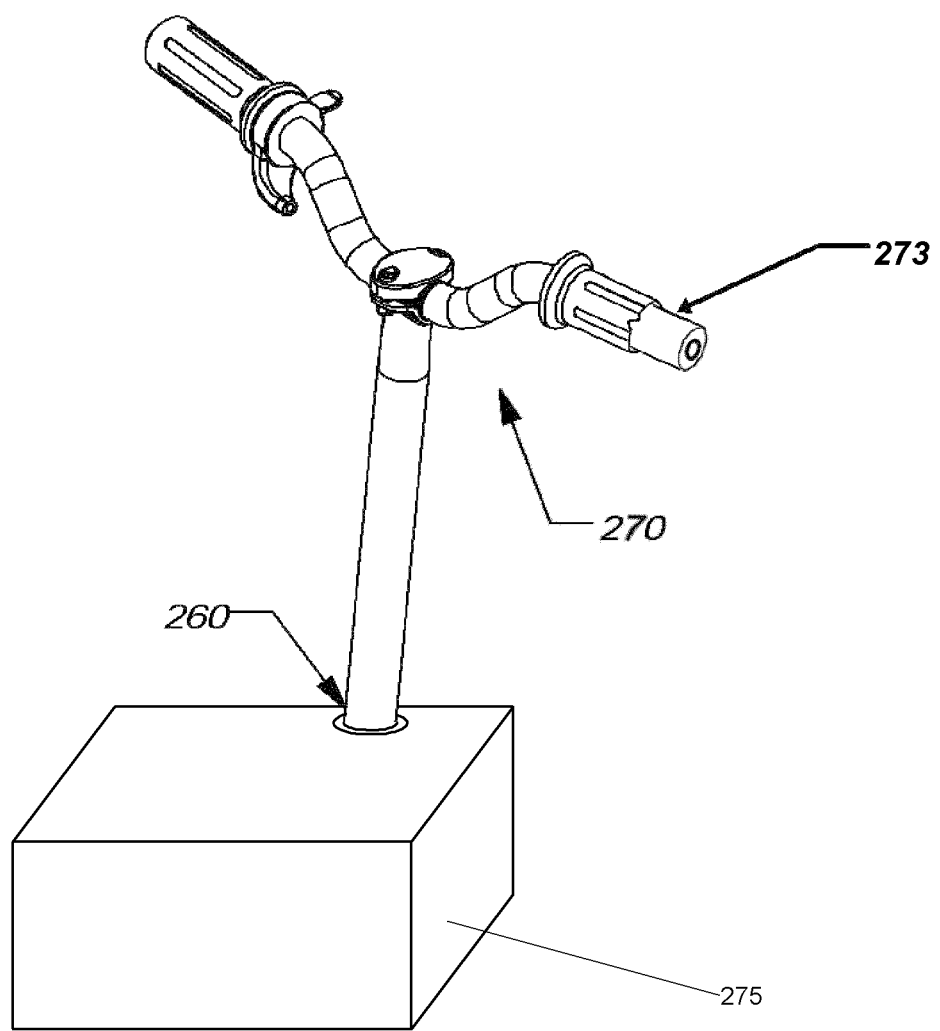
FIG. 5 is a view of a removable portion of the scooter assembly of FIG. 1 containing one or more batteries removed from the scooter and positioned in a charging device.
Figure 6:
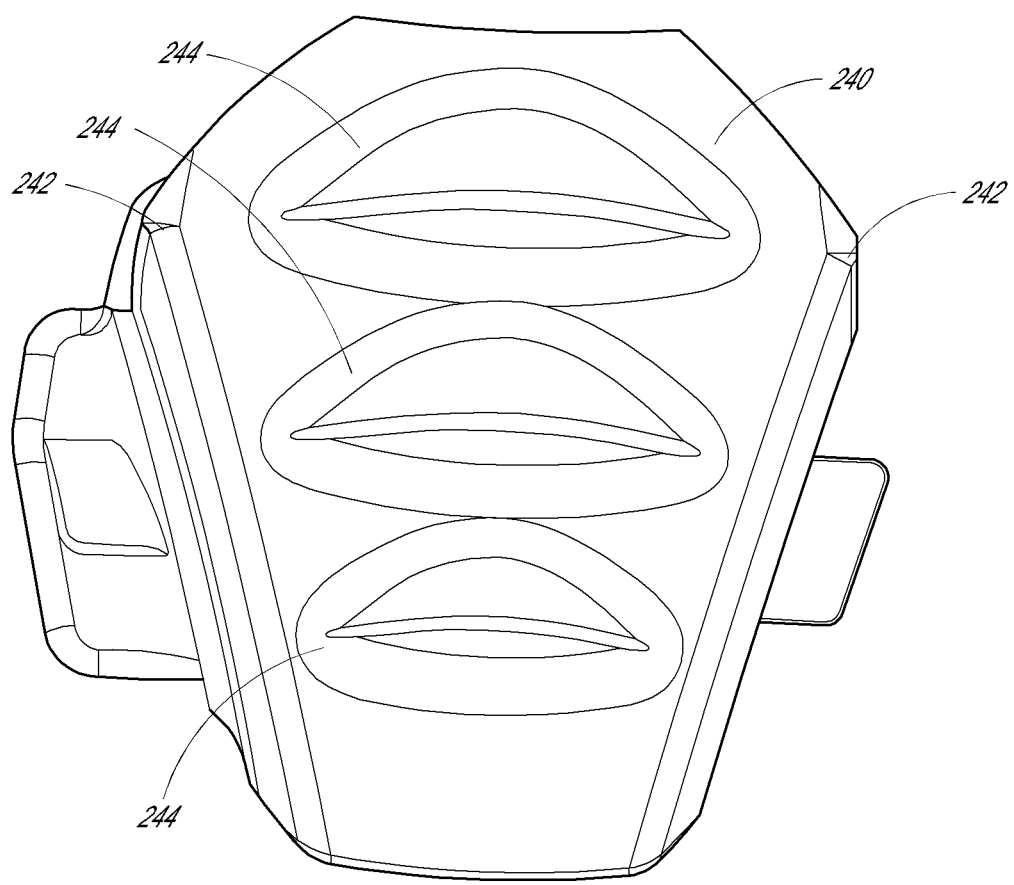
FIG. 6 is a top view of an embodiment of a foot brake of the scooter assembly of FIG. 1 separate from the scooter assembly.
Figure 7:
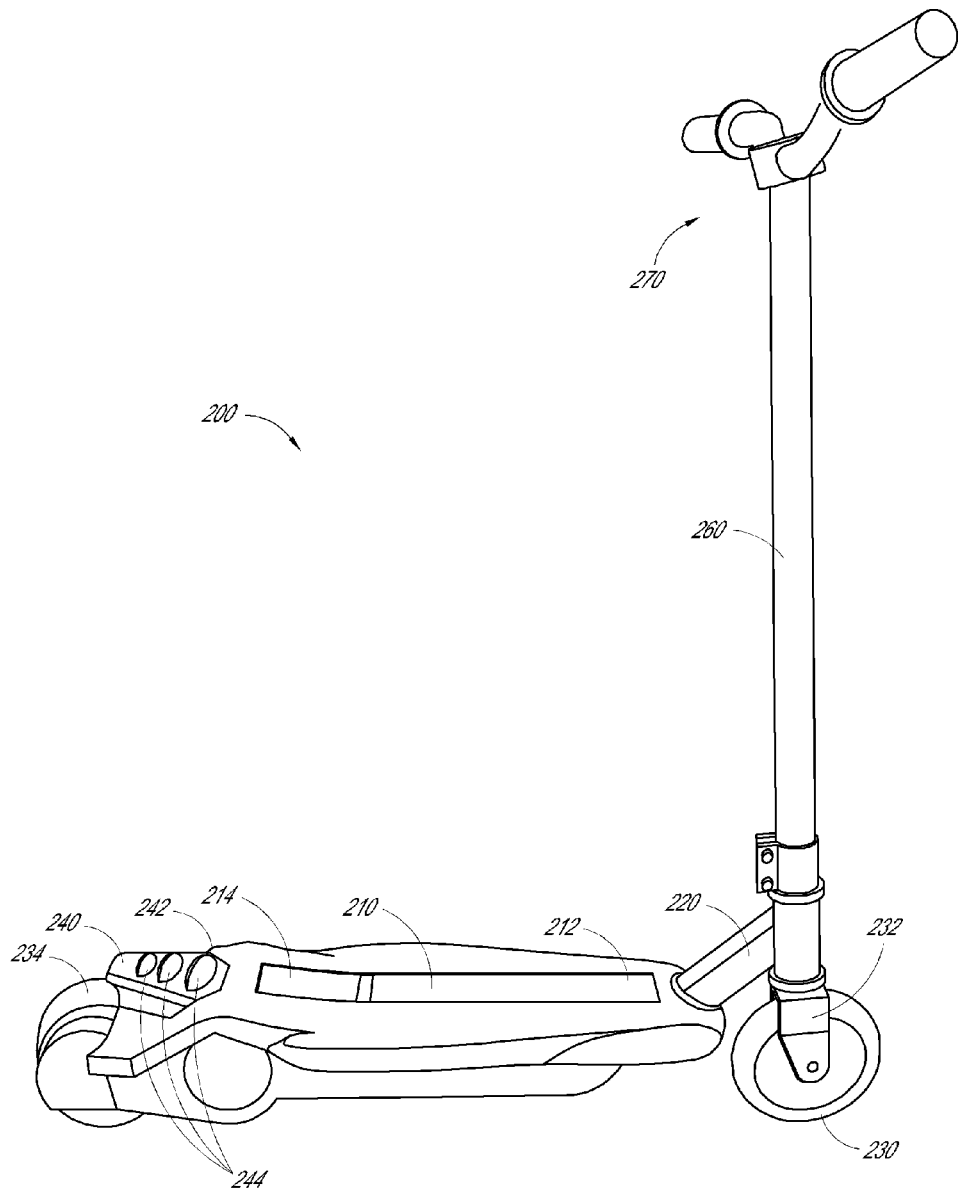
FIG. 7 is a left side view of the scooter assembly of FIG. 1.
Figure 8:
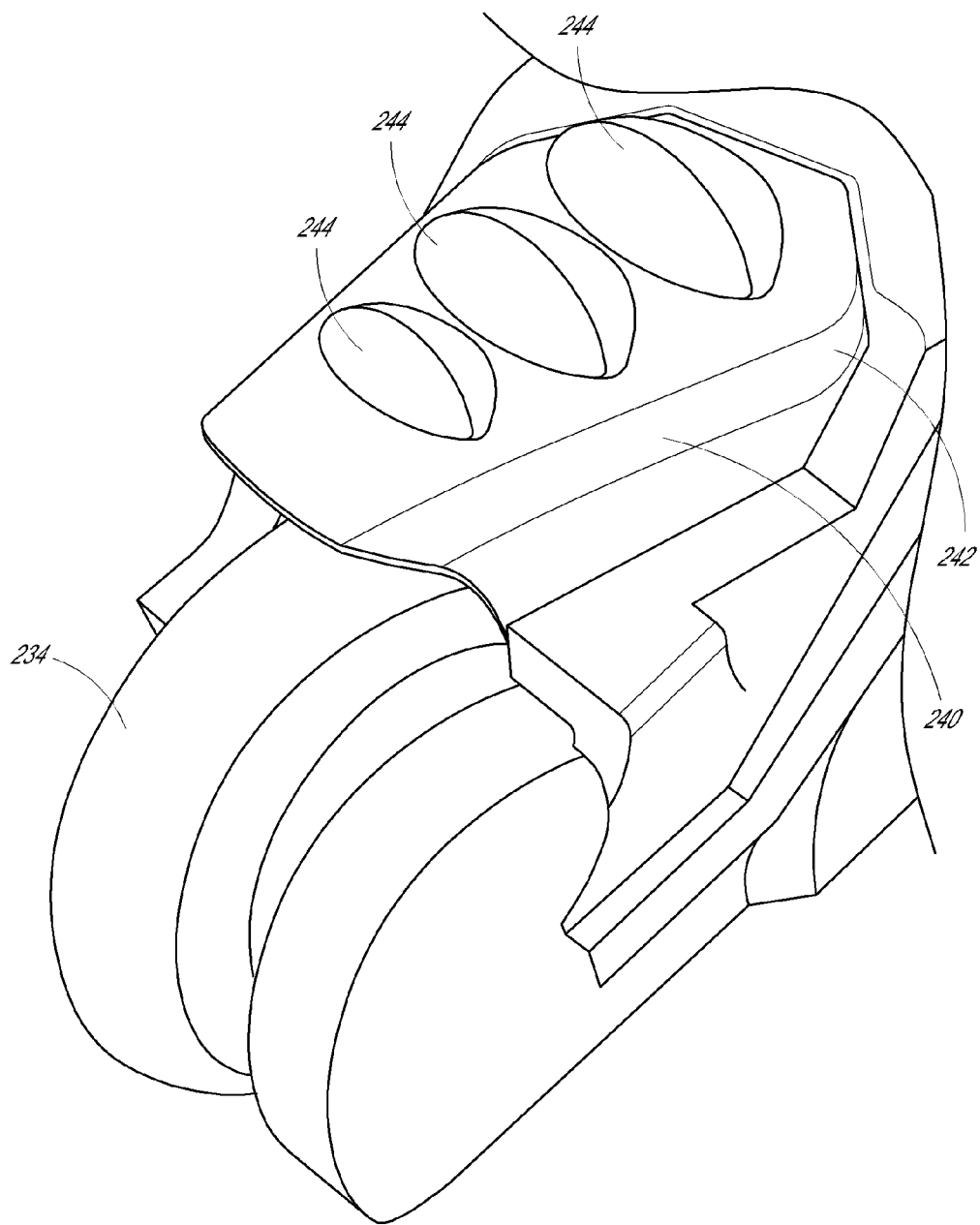
FIG. 8 is a perspective view of a rear portion of the scooter assembly of FIG. 1.

FIG. 3 shows a top view of the scooter assembly 200 that comprises the deck 210, the front deck portion 212, the rear deck portion 214, the rear wheel 234, the foot brake 240, the steering tube 260, and the handlebar assembly 270. The handlebar assembly 270 can comprise a left handle 272, a right handle 274, a left handlebar mount 276, and a right handlebar mount 278.

In some embodiments, the scooter assembly 200 is an electric scooter powered by one or more batteries. In particular, the scooter assembly 200 can be adapted to receive electric power from one or more batteries 273 located within a tubular member or within multiple tubular members of the scooter frame. For example, interiors of the left handle 272 and/or the right handle 274 can be configured to receive one or more batteries 273. The batteries can be any type of batteries. In preferred embodiments, the batteries can be lithium ion rechargeable batteries. In other embodiments, the batteries can be nickel-cadmium, nickel-metal hydride, nickel-zinc, or other rechargeable batteries. The batteries can be any size and shape that fit within a scooter frame or other tubular component. For example, for scooter frames with tubular members, any batteries that can fit within the tubular members can be used. These may include standard battery sizes, including AAA, AA, C, D, 1/2AA, AAAA, A, B, F, N, A23, A27, 4SR44, 523, 531, CR123A, CR2, CR-V3, 10180, 10280, 10440, 14250, 14500, 14650, 15270, 16340, RCR123A, 17500, 17670, 18350, 18500, 18650, 19670, 25500, 26650, and 32600 batteries. For scooter frames with rectangular members, any batteries that can fit within the rectangular members can be used. These can include 4.5V, 9-V, and Lantern batteries. In addition, the batteries can be custom-shaped to be configured to fit within the members of the scooter frame. For example, the batteries can be custom-shaped round/cylindrical lithium-ion rechargeable batteries.

In some embodiments, the frame members are configured so that internal batteries can be removed from the frame members for charging. In other embodiments, the frame members themselves can comprise battery packs configured for charging, and the internal battery elements of the battery packs are not configured to be removable. For example, as described further below, in various embodiments the left handle 272 and right handle 274 can comprise detachable battery packs, the steering tube 260 can comprise a detachable battery pack, and/or the handlebar assembly 270 can comprise a detachable battery pack.

In some embodiments, the left handle 272 and right handle 274 are configured to be detachable. As such, when the batteries are depleted, a user can detach either or both of the left handle 272 and right handle 274 for recharging of its batteries and, with minimal interruption of scooter use, replace them with another left handle 272 and/or right handle 274 that are already partially or fully charged. To facilitate ease and speed of removal and replacement of left handle 272 and right handle 274, the left handle 272 and right handle 274 can be configured to attach to the left handlebar mount 276 and the right handlebar mount 278 through a clip-in or snap-on mechanism. For example, any known clip-in or snap-on mechanism can be used to removably attach the left handle 272 and right handle 274 to the left handlebar mount 276 and the right handlebar mount 278, such as push-pin connections often used on scooter handles or other types of interlocking arrangements. As such, the left handle 272 and right handle 274 battery packs can be detachable, preferably without removal of any covers or other disassembly, and quickly swappable with replacement left handle and right handle battery packs, thereby allowing for near-continuous operation of an electric scooter with little or almost no downtime due to recharging.

Figure 15:
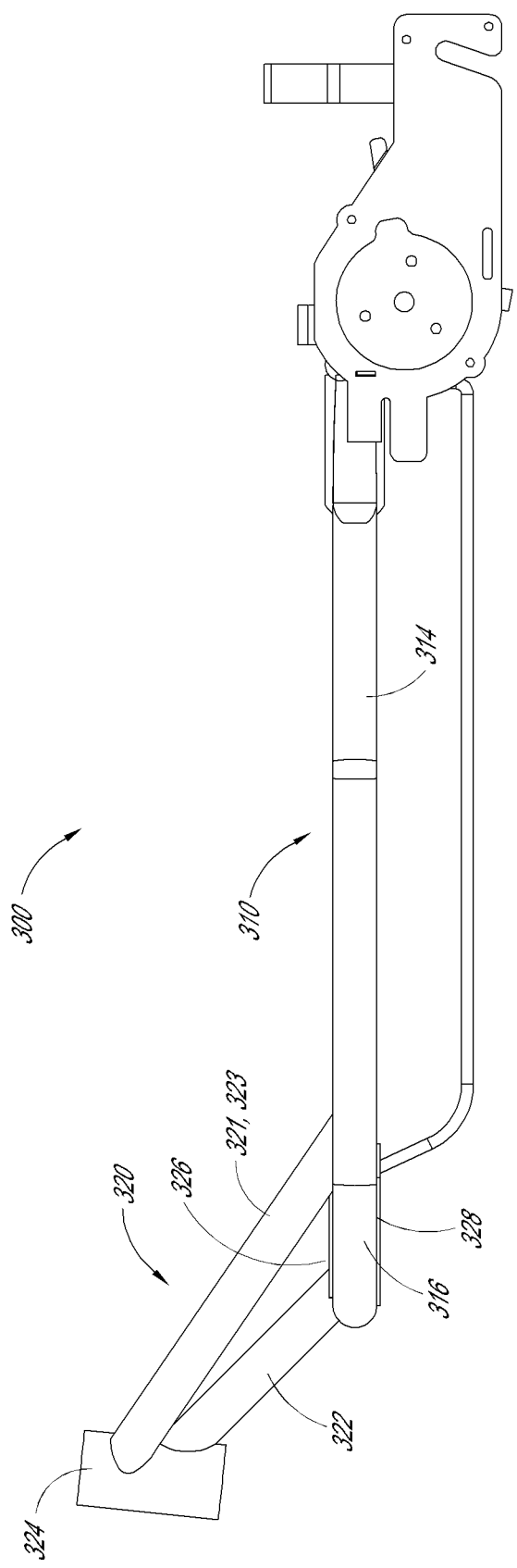
FIG. 15 is a right side view of the scooter frame assembly of FIG. 12.
Figure 23:
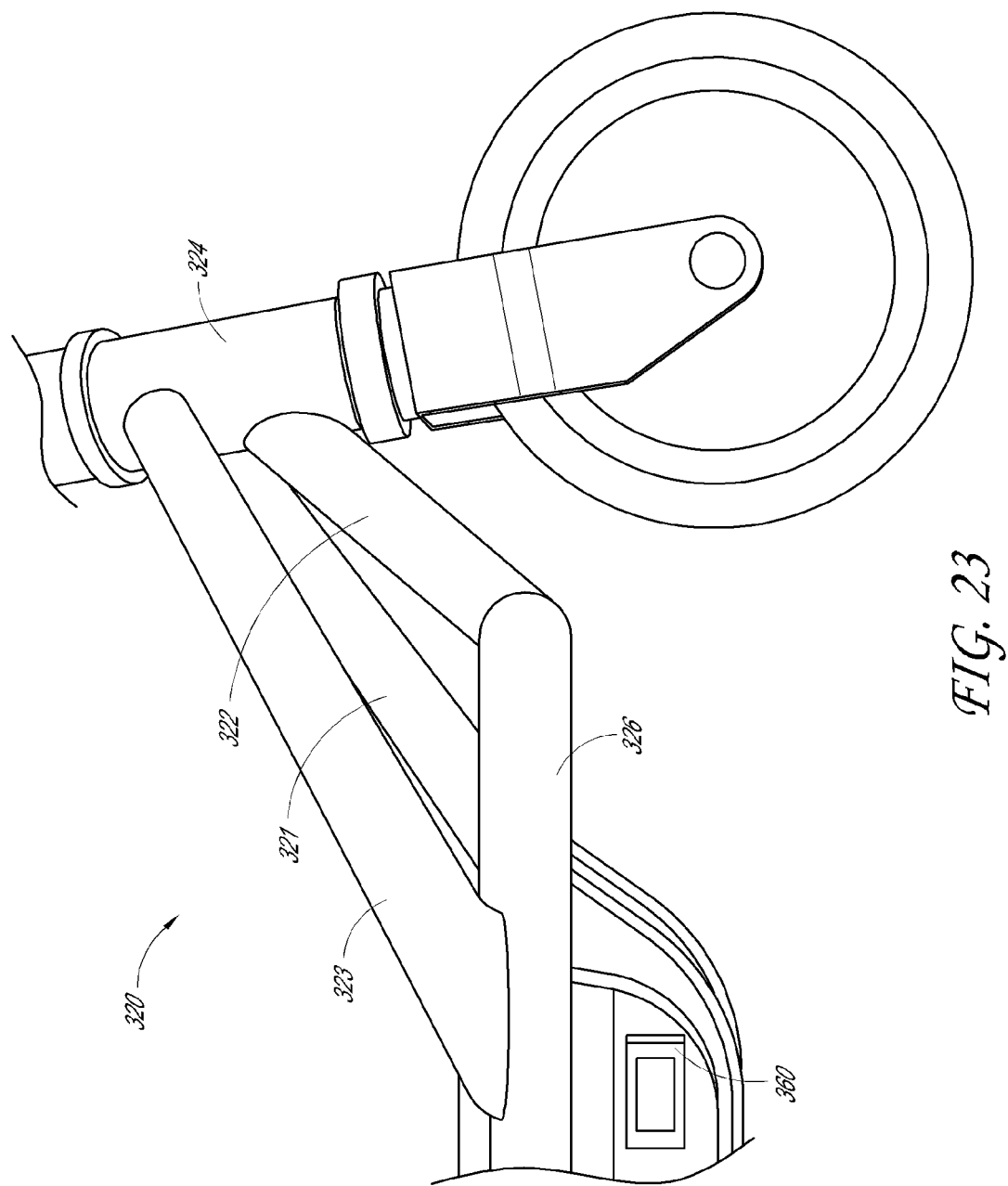
FIG. 23 is a left side view of a lower-front portion of an embodiment of a scooter assembly.

The scooter assembly can comprise wiring to electrically connect the batteries with the other electrical elements of the scooter assembly 200, such as an electric motor and an on-off switch (e.g., switch 360 shown in FIG. 23). For example, in some embodiments, the scooter assembly can comprise wiring within the left handlebar mount 276 and the right handlebar mount 278 that is adapted to make an electrical connection with the left handle 272 and right handle 274 battery packs. The wiring can continue through the left handlebar mount 276 and the right handlebar mount 278, down through the steering column 260, through the head tube 232 and/or neck 230, and through the deck 210 (e.g., through tubular deck member 312 a second tubular deck member 314 as shown in FIG. 15), and continue so that the wiring can make electrical connections with the electric motor and the on-off switch. In preferred embodiments, the wiring is located within the members of the scooter frame. In other embodiments, the wiring can be external to the scooter frame and run along the frame, or some combination of internal and external. The batteries within the left handle 272 and right handle 274 can be wired together in series or parallel, or any combination of series and parallel configurations.

Once depleted and detached from the scooter frame, the left handle 272 and right handle 274 battery packs can be placed into a charger for charging. The charger can be specially configured to charge the left and right handle battery packs. In other embodiments, the batteries can be removed from within the left handle 272 and right handle 274 and placed into a standard or otherwise suitable battery charger or otherwise connected to a battery charger arrangement (e.g., a plug-in charger). Once charged, the batteries can be reinserted into the left handle 272 and right handle 274 before the left handle 272 and right handle 274 is re-attached back on to the handlebar assembly of the scooter.

In some embodiments, other tubular member(s) of the scooter assembly can also be configured to receive one or more batteries. For example, in some embodiments, any one or more of the steering tube 260 and handlebar assembly 270, comprising left handle 272, right handle 274, left handlebar mount 276, and right handlebar mount 278, can be configured to receive one or more batteries. Together, the steering tube 260 and handlebar assembly 270 can comprise a steering column. In some embodiments, the steering column is configured to be detachable. As such, when the batteries 273 within the steering column (FIG. 4) are depleted, a user can detach the steering column for recharging its batteries and, with minimal interruption of scooter use, replace them with another steering column that is already fully charged. Alternatively, a user can place the steering column in a charger 275 (FIG. 5) or connect to a charger and wait for the batteries to be charged. To facilitate ease and speed of removal and replacement of the steering column, the steering column can be configured to attach to the rest of the scooter assembly through a clip-in, snap-on, lever lock arrangement or other suitable mechanisms. For example, any known clip-in, snap-on, lever lock or other suitable mechanism can be used to removably attach the steering column. In addition or in the alternative, the clamp assembly 250 or a lower portion of the steering column can be configured to include a lever that provides a locked position in which the steering column or upper portion of the steering column is not removable and an unlocked position in which the steering column or upper portion of the steering column is removable. As such, the steering column battery pack can be detachable, without removal of any covers or other disassembly, and quickly swappable with a replacement steering column battery pack, thereby allowing for near-continuous operation of an electric scooter with almost no downtime due to recharging. Because the steering column, which includes the left and right handles, has greater volume for holding more batteries than the left and right handles alone, the steering column can store more electrical energy and provide for longer scooter operation times between recharging.

Once depleted and detached from the scooter frame, the steering column battery pack can be placed into a charger or connected to a charger for charging. The charger can be specially configured to charge the steering column battery pack. In other embodiments, the batteries can be removed from within the steering column and placed into a standard or otherwise suitable battery charger. Once charged, the batteries can be reinserted into the steering column before the steering column is re-attached back on to the scooter frame.

Figure 12:
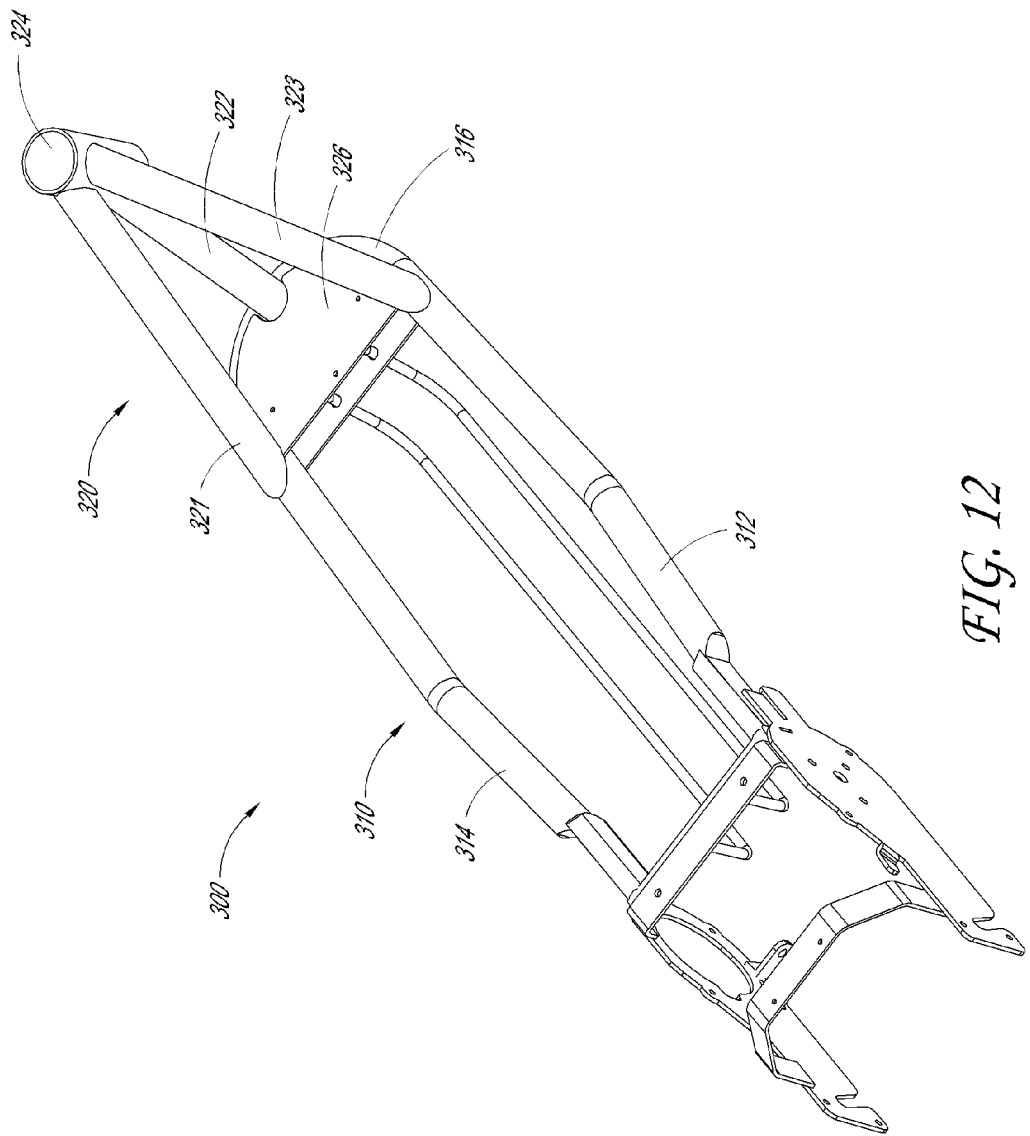
FIG. 12 is a perspective view of an embodiment of a scooter frame assembly.
Figure 13:
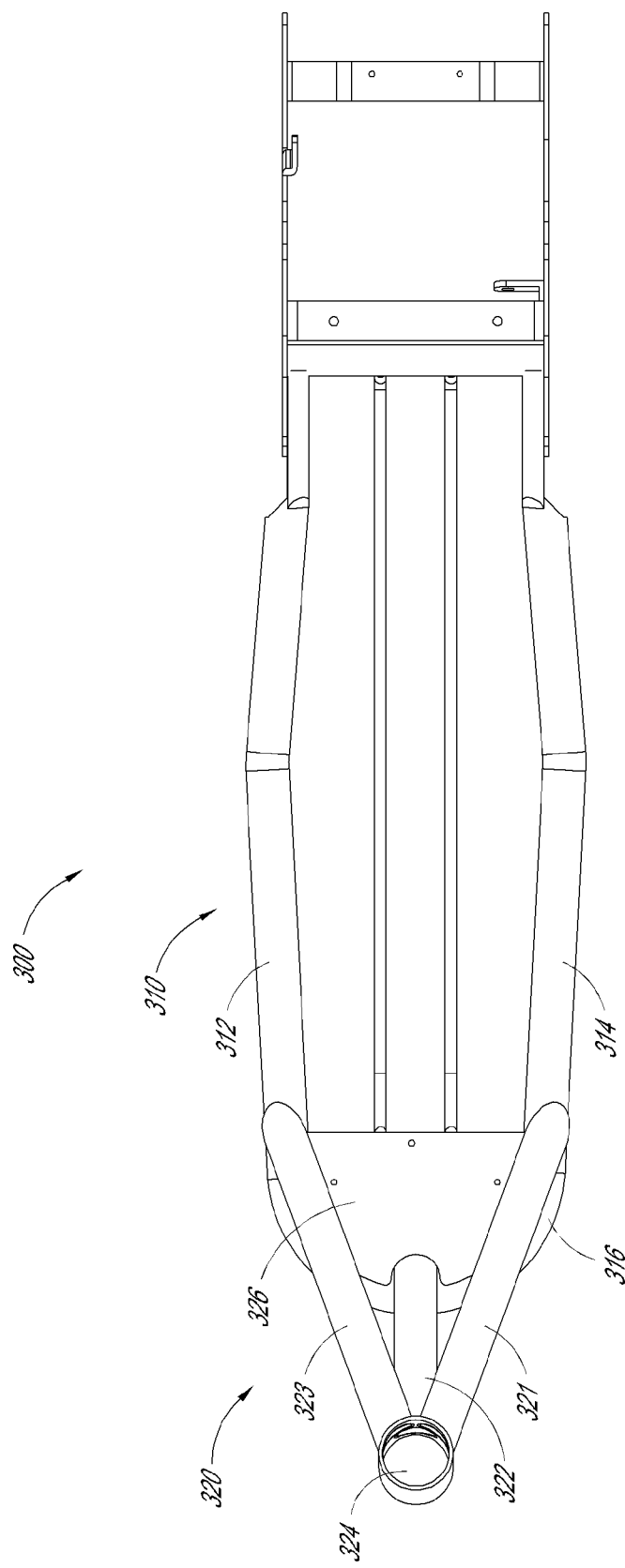
FIG. 13 is a top view of the scooter frame assembly of FIG. 12.
Figure 14:
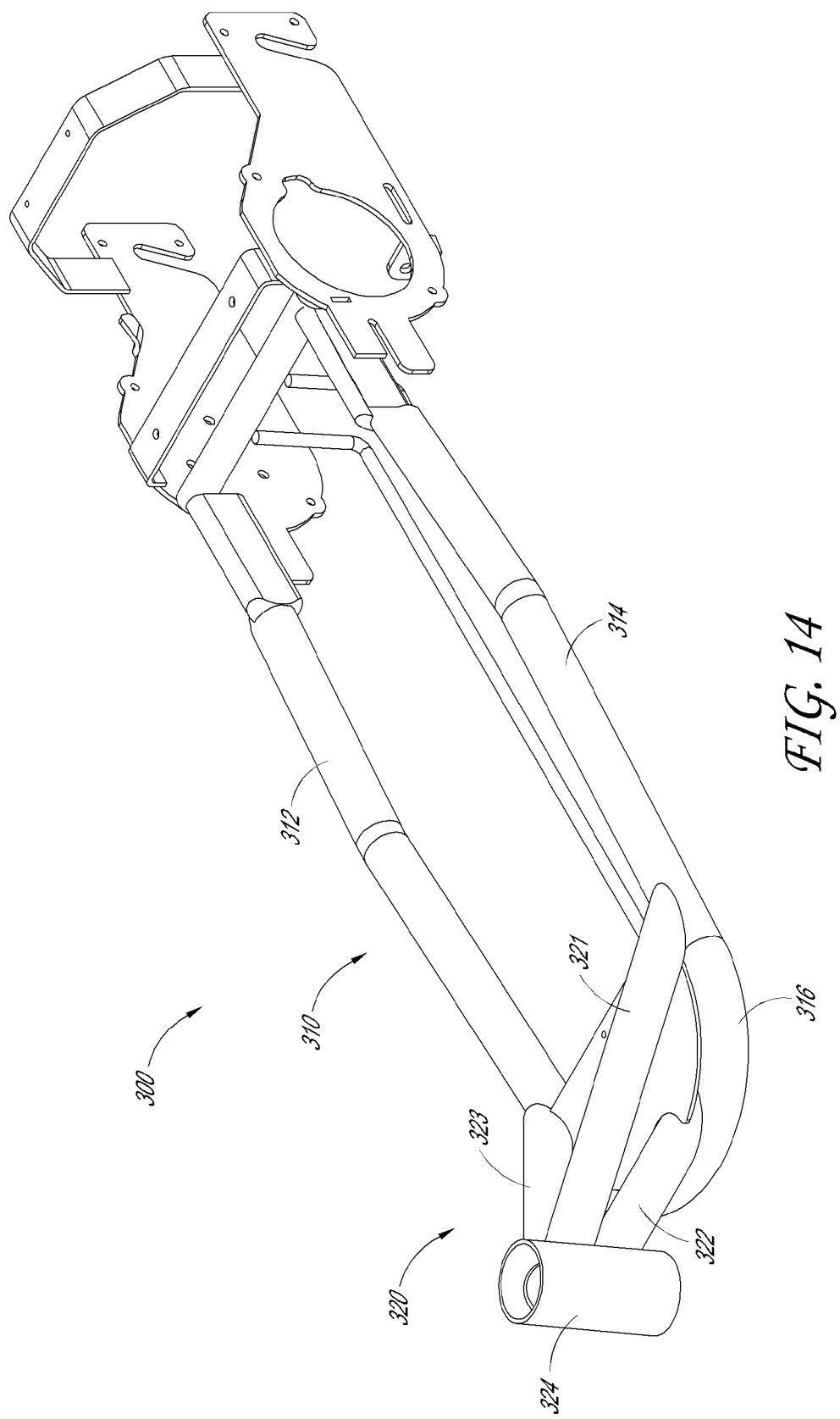
FIG. 14 is another perspective view of the scooter frame assembly of FIG. 12.

As described above, the scooter assembly 200 can comprise wiring to electrically connect the batteries with the other electrical elements of the scooter assembly 200, such as an electric motor and an on-off switch (e.g., switch 360 shown in FIG. 23). For example, in embodiments in which the steering column comprises a battery pack, the scooter assembly 200 can comprise wiring from the steering column, through the head tube 232 and/or neck 230, and through the deck 210 (e.g., through tubular deck member 312 and/or a second tubular deck member 314 as shown in FIG. 12), and continue so that the wiring can make electrical connections with the electric motor and the on-off switch. In preferred embodiments, the wiring is located within the members of the scooter frame. In other embodiments, the wiring can be external to the scooter frame and run along the frame, or some combination of internal and external. In the event of multiple batteries, the batteries within the steering column can be wired together in series or parallel, or any combination of series and parallel configurations.

In some embodiments, another tubular member or other members of the scooter assembly 200 can also or alternatively be configured to receive one or more batteries. For example, in some embodiments, the handlebar assembly 270, comprising left handle 272, right handle 274, left handlebar mount 276, and right handlebar mount 278 can be configured to receive one or more batteries. In some embodiments, the handlebar assembly 270 is configured to be detachable. As such, when the batteries within the handlebar assembly 270 are depleted, a user can detach the handlebar assembly 270 for recharging its batteries and, with minimal interruption of scooter use, replace them with another handlebar assembly 270 that is already fully charged. Alternatively, a scooter user can place the handlebar assembly 270 in a charger or connect to a charger and wait for the batteries to be charged. To facilitate ease and speed of removal and replacement of the handlebar assembly 270, the handlebar assembly 270 can be configured to attach to the steering tube 260 through a clip-in, snap-on, or other lever mechanism. For example, any known clip-in, snap-on, or other lever mechanism can be used to removably attach the handlebar assembly 270. In addition, a lever can be provided at the junction between the steering tube 260 and the handlebar assembly 270 that can provide a locked position in which the handlebar assembly 270 is not removable and an unlocked position in which the handlebar assembly 270 is removable. As such, the handlebar assembly battery pack can be detachable, without removal of any covers or other disassembly, and quickly swappable with a replacement handlebar assembly battery pack, thereby allowing for near-continuous operation of an electric scooter with almost no downtime due to recharging.

Once depleted and detached from the scooter frame, the handlebar assembly battery pack can be placed into a charger or connected to a charger for charging. The charger can be specially configured to charge the handlebar assembly battery pack. In other embodiments, the batteries can be removed from within the handlebar assembly 270 and placed into a standard or suitable battery charger. Once charged, the batteries can be reinserted into the handlebar assembly 270 before the handlebar assembly 270 is re-attached back on to the steering tube 260.

The scooter assembly can comprise wiring to electrically connect the batteries with the other electrical elements of the scooter assembly, such as an electric motor and an on-off switch (e.g., switch 360 shown in FIG. 23). For example, in embodiments in which the handlebar assembly 270 comprises a battery pack, the scooter assembly can comprise wiring from the handlebar assembly 270, through the steering tube 260, through the head tube 232 and/or neck 230, and through the deck 210 (e.g., through tubular deck member 312 and/or a second tubular deck member 314 as shown in FIG. 12), and continue so that the wiring can make electrical connections with the electric motor and the on-off switch. In preferred embodiments, the wiring is located within the members of the scooter frame. In other embodiments, the wiring can be external to the scooter frame and run along the frame, or some combination of internal and external. If multiple batteries are provided, the batteries within the handlebar assembly 270 can be wired together in series or parallel, or any combination of series and parallel configurations.

In some embodiments, multiple components of the scooter assembly that contain batteries are detachable. For example, in some embodiments, both the left and right handles and the steering column can be separately detachable. By having each of the left and right handles and the steering column be separately detachable, a user is provided with more control and choices with respect to charging options and interchanging charged components. In some other embodiments, an one or more of the left and right handles, the handlebar assembly, the steering column, and the steering tube can be separately detachable.

In some other embodiments, any other tubular member of the scooter assembly 200 can also or alternatively be configured to receive one or more batteries. For example, the left handlebar mount 276 and the right handlebar mount 278 can each be adapted to receive one or more rechargeable batteries, including lithium-ion batteries. Other tubular members that can be adapted to receive one or more rechargeable batteries include the head tube 232. In addition, as pictured in FIG. 12, other tubular members that can be adapted to receive one or more rechargeable batteries include a first tubular deck member 312, a second tubular deck member 314, a first tubular neck member 321, a second tubular neck member 322, and a third tubular neck member 323. In these other embodiments, the scooter assembly 200 can include all appropriate wiring to deliver electric power from the one or more batteries, at any location, to an electric motor, which can be located underneath a rear portion 214 of the deck 210.

Some portions of the scooter assembly that can be configured to receive one or more batteries are easily detachable, including the left handle 272 and right handle 274. For sections that are detachable, recharging of the one or more batteries can be accomplished while the portions are detached. Other portions of the scooter assembly that can be configured to receive one or more batteries are not as easily detachable, such as the first tubular deck member 312, the second tubular deck member 314, the first tubular neck member 321, the second tubular neck member 322, and the third tubular neck member 323. In order to recharge the one or more batteries located in tubular portions of the scooter assembly that are not easily detachable, the scooter frame can be provided with an electrical input socket 325 and a wiring system to deliver electrical power from the input socket to each of the one or more batteries.

FIGS. 6 and 8-11 show the foot brake 240 that is configured for use at or near a rear portion of the deck of the scooter assembly 200. As described, the foot brake 240 can comprise the plurality of ridges 244 to enhance traction of the foot brake 240 and provide ease of location of the foot brake 240 for a rider. As shown, the foot brake 240 comprises three ridges, which preferably protrude significantly higher from the surrounding surface than any other protrusions near the rearward end of the scooter deck 210 to facilitate location by feel without the user needing to visually identify the foot brake 240. In addition, the foot brake 240 can otherwise be relatively continuous with the surrounding portions of the deck 210 and the deck 210 in general to provide an attractive appearance to the foot brake 240. Thus, the foot brake 240 preferably defines an upper surface that extends rearwardly in a substantially continuous fashion and along a substantially continuous path from an upper surface of the portion of the deck 210 forward of the foot brake 240. With reference to FIG. 1, for example, the rearward portion 214 of the deck 210 and the foot brake 240 define a continuous upper surface, which in the illustrated arrangement is rises up relative to the front portion 212 of the deck 210 and is slightly curved. Thus, the foot brake 240 can be considered as a portion of the upper deck surface and, preferably, defines a rearward most upper surface of the overall deck of the scooter 200. In other words, the foot brake 240 extends rearwardly from a rearward edge of the deck 210. In alternative embodiments, the foot brake 240 can comprise fewer or more ridges. In preferred embodiments, the foot brake 240 can comprise plastic. In other embodiments, the foot brake 240 can comprise metals, carbon fiber, or any other suitable material. The foot brake 240 can be configured to pivot about the pivot axis 242. By pivoting downward, the foot brake 240 can provide a braking pressure to the rear wheel 234.

FIGS. 12-15 generally relate to an embodiment of a scooter frame comprising a deck, a neck, and a head tube, wherein the neck comprises two or more tubular members connecting the deck to the head tube. The frame is suitable for use with any scooter described herein.

FIGS. 12-15 show a rear side perspective view of an embodiment of a scooter frame assembly 300 that generally comprises a deck frame section 310 and a neck section 320. The deck frame section 310 can comprise a first tubular deck member 312 and a second tubular deck member 314. The neck section 320 can comprise a first tubular neck member 321, a second tubular neck member 322, a third tubular neck member 323, a head tube 324, and a base section 326. The first tubular neck member 321 can securely attach the second tubular deck member 314 and base section 326 with the head tube 324. The second tubular neck member 322 can securely attach the base section 326 with the head tube 324. The third tubular neck member 323 can securely attach the first tubular deck member 312 and the base section 326 with the head tube 324.

The first tubular deck member 312, the second tubular deck member 314, the first tubular neck member 321, the second tubular neck member 322, and the third tubular neck member 323 each comprise a tubular member having an approximately circular cross section. In other embodiments, the first tubular deck member 312, the second tubular deck member 314, the first tubular neck member 321, the second tubular neck member 322, and the third tubular neck member 323 can comprise any other cross sectional shapes, including square, triangular, rectangular, and oval. The plurality of tubular neck members connecting the deck frame section with the head tube enhances the strength of the connection. In addition to enhancing the strength of the connection, the connection comprising a plurality of tubular neck members can provide ergonomic and riding style options not present in a connection comprising a single member. In addition, the connection comprising a plurality of tubular members can facilitate the attachment of additional accessories, for the riding deck surface, or other attachments.

As shown in FIG. 12, the scooter frame assembly 300 comprises three tubular neck members 321, 322, and 323. In other embodiments, the scooter frame assembly can comprise two tubular neck members connecting the deck frame section 310 and head tube 324. In other alternative embodiments, the scooter frame assembly can comprise four or more tubular neck members connecting the deck frame section 310 and the head tube 324.

FIGS. 16-21 illustrate the scooter neck sub-assembly comprising the neck and the head tube separate from the frame assembly of FIGS. 12-15. As described, the neck comprises two or more tubular members connecting to the head tube.

Figure 16:
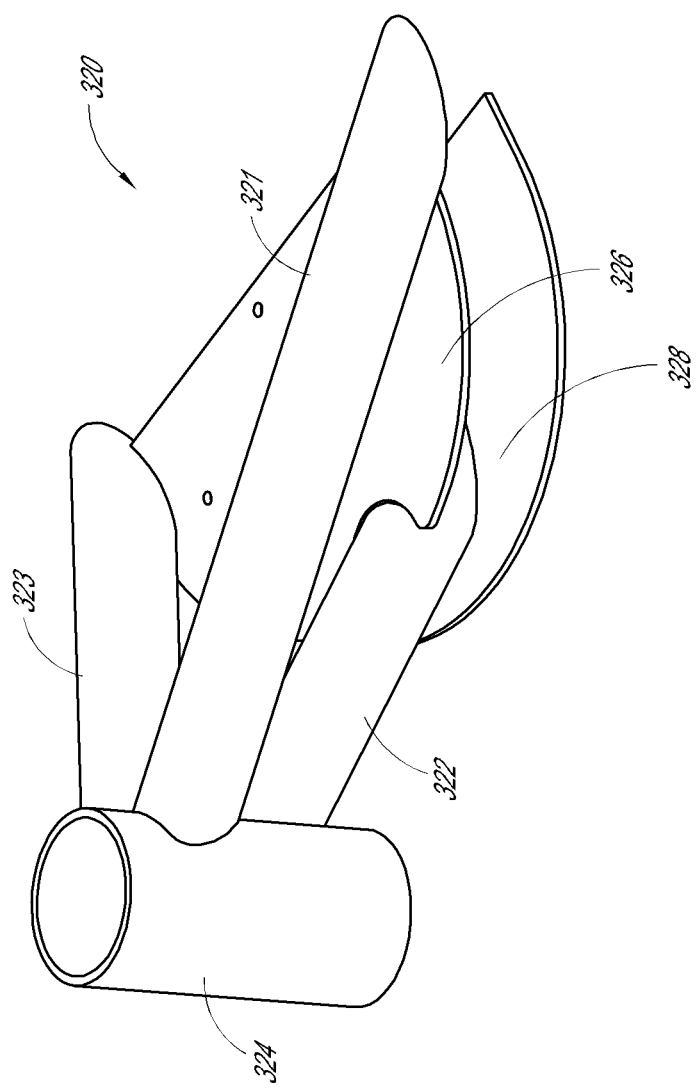
FIG. 16 is a perspective view of an embodiment of a scooter neck section.
Figure 17:
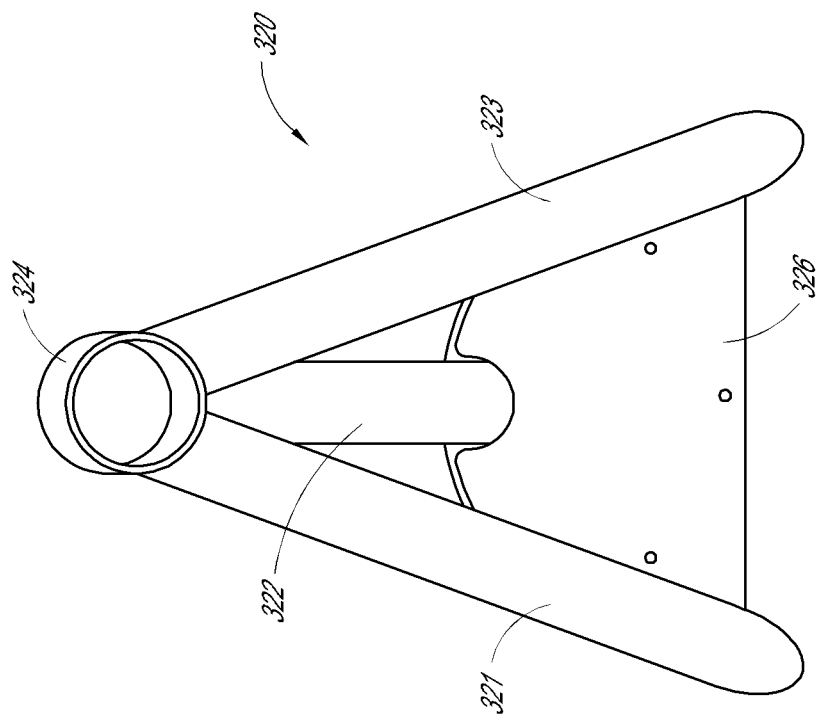
FIG. 17 is a top view of the scooter neck section of FIG. 16.
Figure 18:
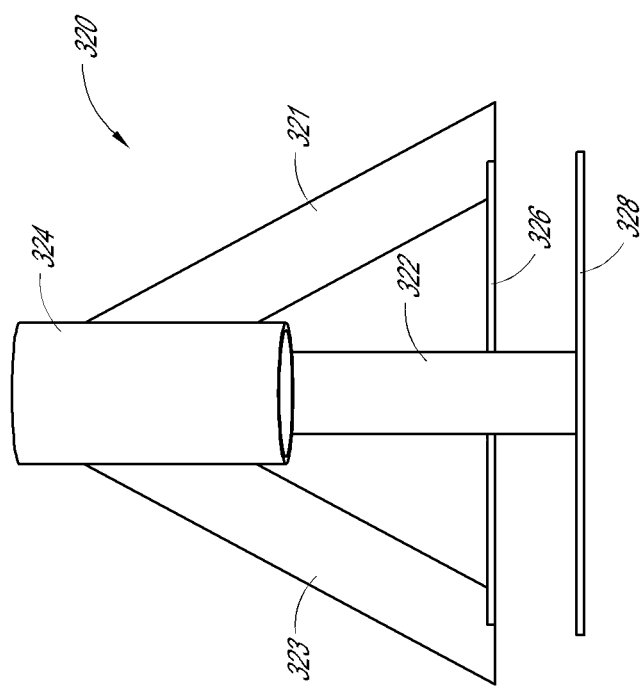
FIG. 18 is a front view of the scooter neck section of FIG. 16.
Figure 19:
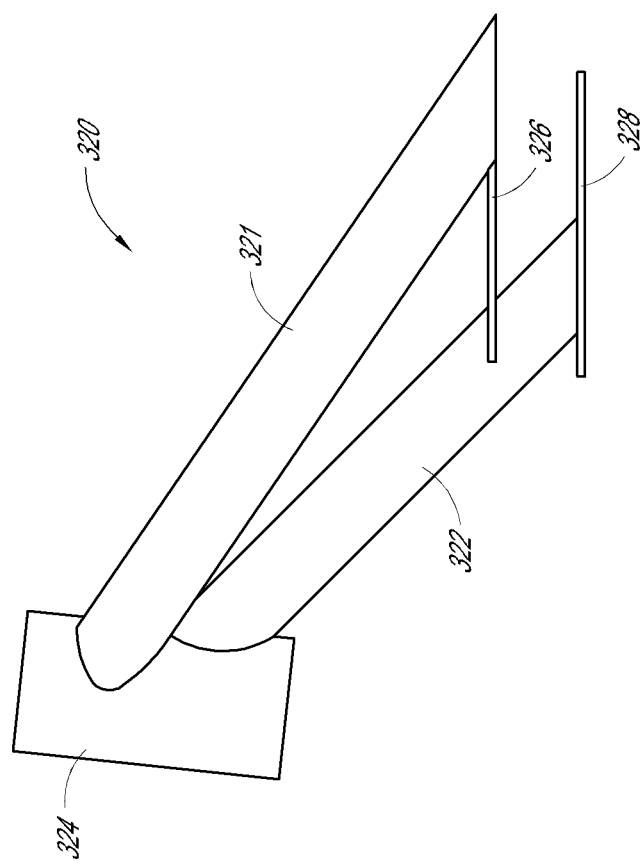
FIG. 19 is a right side view of the scooter neck section of FIG. 16.
Figure 20:
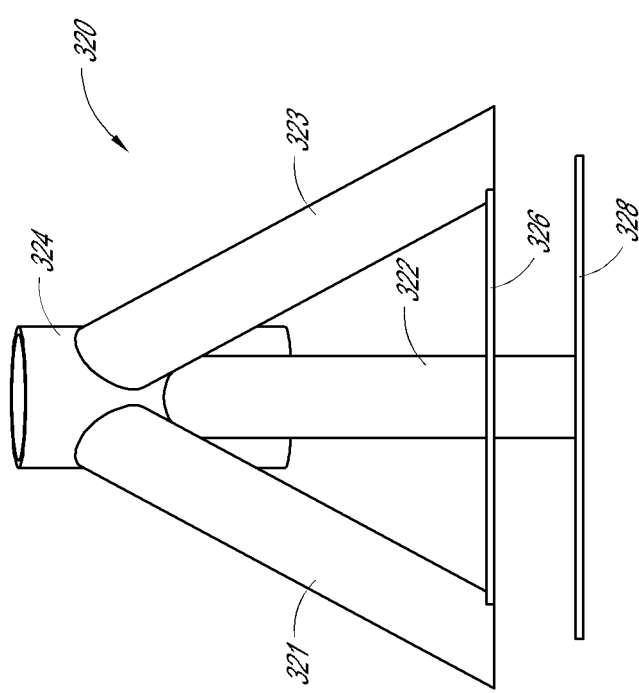
FIG. 20 is a rear view of the scooter neck section of FIG. 16.
Figure 21:
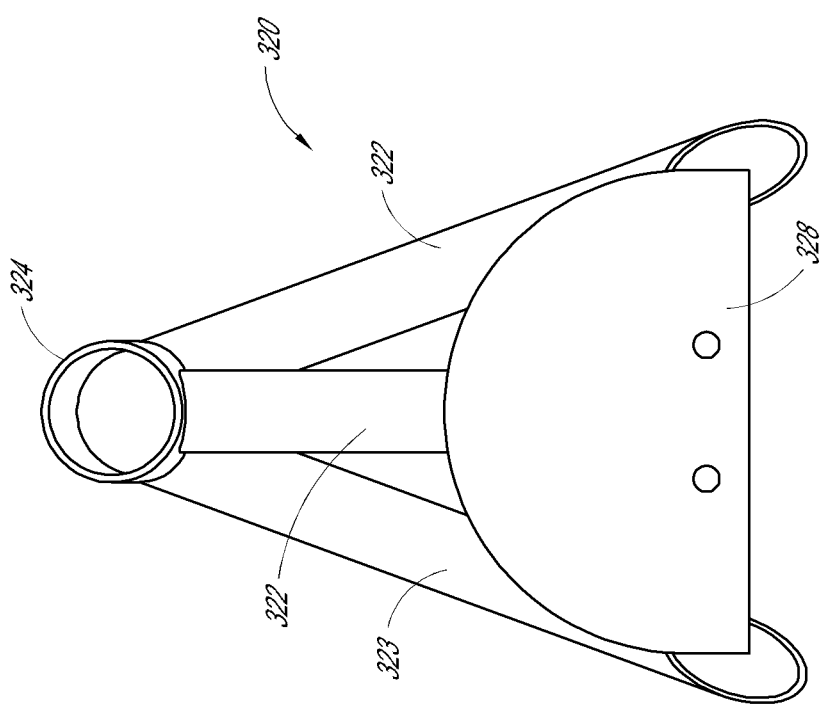
FIG. 21 is a bottom view of the scooter neck section of FIG. 16.

FIGS. 16-21 show various views of the scooter neck section 320 that generally comprises the first tubular neck member 321, the second tubular neck member 322, the third tubular neck member 323, the head tube 324, a first base section 326, and a second base section 328. The first tubular neck member 321 and third tubular neck member 323 can securely attach the first base section 326 with the head tube 324. The second tubular neck member 322 can securely attach the second base section 328 with the head tube 324. As apparent in FIG. 15, for example, the first base section 326 is positioned above the deck frame section 310 and the second base section 328 is positioned below the deck frame section 310. A forward portion of the first base section 326 can include a cut-out to accommodate the second neck member 322, as shown in FIG. 16, for example. The base sections 326, 328 can be coupled to the deck frame section 310 by any suitable arrangement, such as by welding, for example. The base sections 326, 328 can be coupled to the deck frame section 310 along the entire forward surface, which is generally U-shaped in the illustrated arrangement. The base sections 326, 328 spaced vertically as illustrated and preferably sandwiching the deck frame section 310 (e.g., forward portion 316) therebetween advantageously provide a strong and rigid arrangement for supporting the head tube 324 relative to the deck frame section 310.

Figure 22:
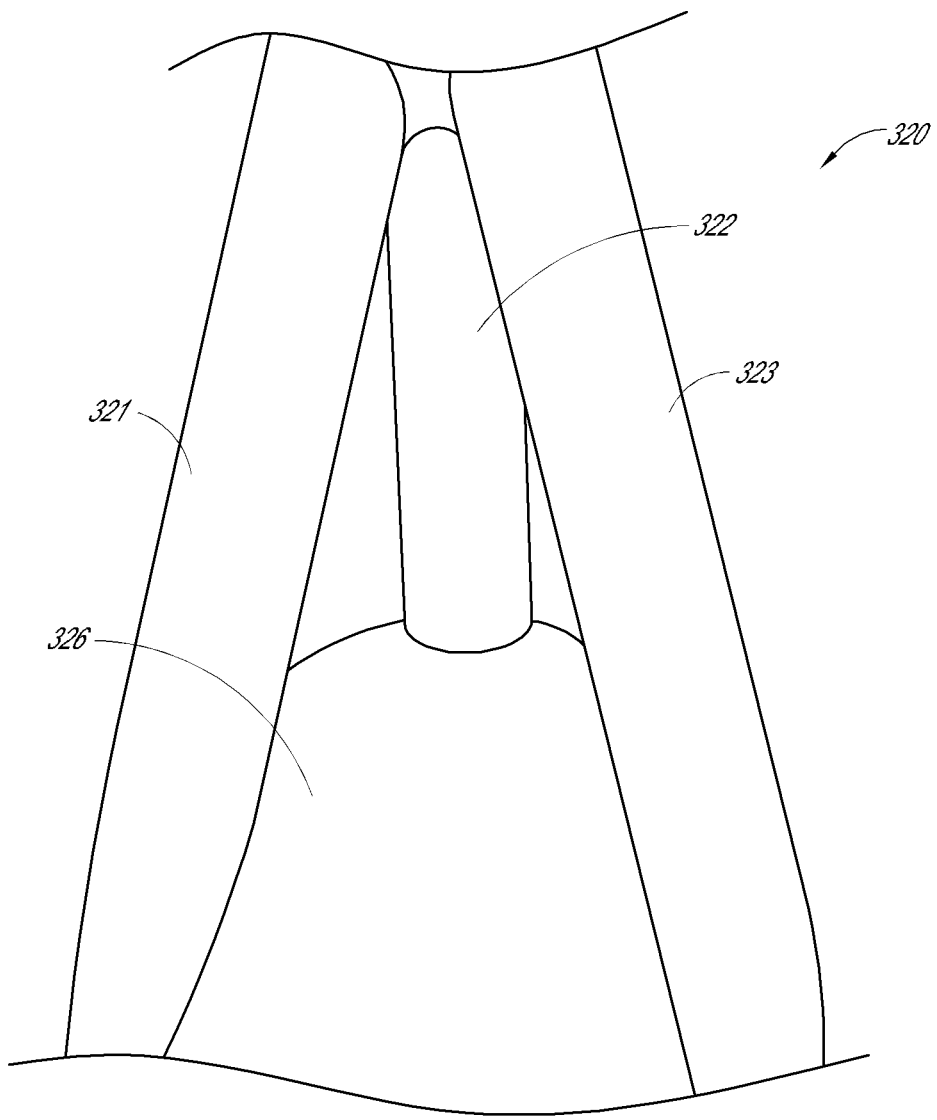
FIG. 22 is a perspective view of another embodiment of a scooter neck section.

FIGS. 22 and 23 illustrate a modification of the scooter neck section 320 that generally comprises a first tubular neck member 321, a second tubular neck member 322, a third tubular neck member 323, a head tube 324, and a base section 326. In the illustrated arrangement, each neck member 321, 322, 323 extends between the head tube 324 and the base section 326 and, preferably, connects to each of the head tube 324 and the base section 326. The base section 326 can be a frame tube arrangement of the frame assembly 300, such as the deck frame section 310 (e.g., frame tubes 312 and 314 and/or a front frame tube portion 316 that couples forward ends of the frame tubes 312, 314). Thus, in the neck section 320 of FIGS. 22 and 23, the two separate base sections are omitted and the multiple neck members 321, 322, 323 preferably are coupled directly to the deck frame section 310.

Preferably, the base or lower ends of the multiple neck members 321, 322, 323 are spaced from one another in a lateral direction of the frame assembly 300 or scooter 200. In the illustrated arrangement, the neck member 321 is coupled to one frame tube 314 and the neck member 323 is coupled to the other frame tube 312. Such a lateral spacing advantageously provides increased rigidity and reduces flex between the head tube 324 and the deck frame section 310. The neck member 322 can be substantially centrally located in a lateral direction of the frame assembly 300. The neck members 321, 322, 323 can be coupled to the head tube 324 at different heights or different axial locations. For example, the side neck members 321, 323 can be coupled at one axial location and the central neck member 322 can be coupled at a different axial location on the head tube 324. The side neck members 321, 323 can be coupled at a higher location or axial location closer to the upper end of the head tube 324 relative to the central neck member 322. Alternatively, this arrangement can be reversed, each neck member can be coupled at a different axial position or all of the neck members can be coupled at substantially the same axial location. An on-off switch 360 is also illustrated that can connect to the wiring arrangement of the scooter 200 and can be used to turn the electric scooter on and off.

Figure 24:
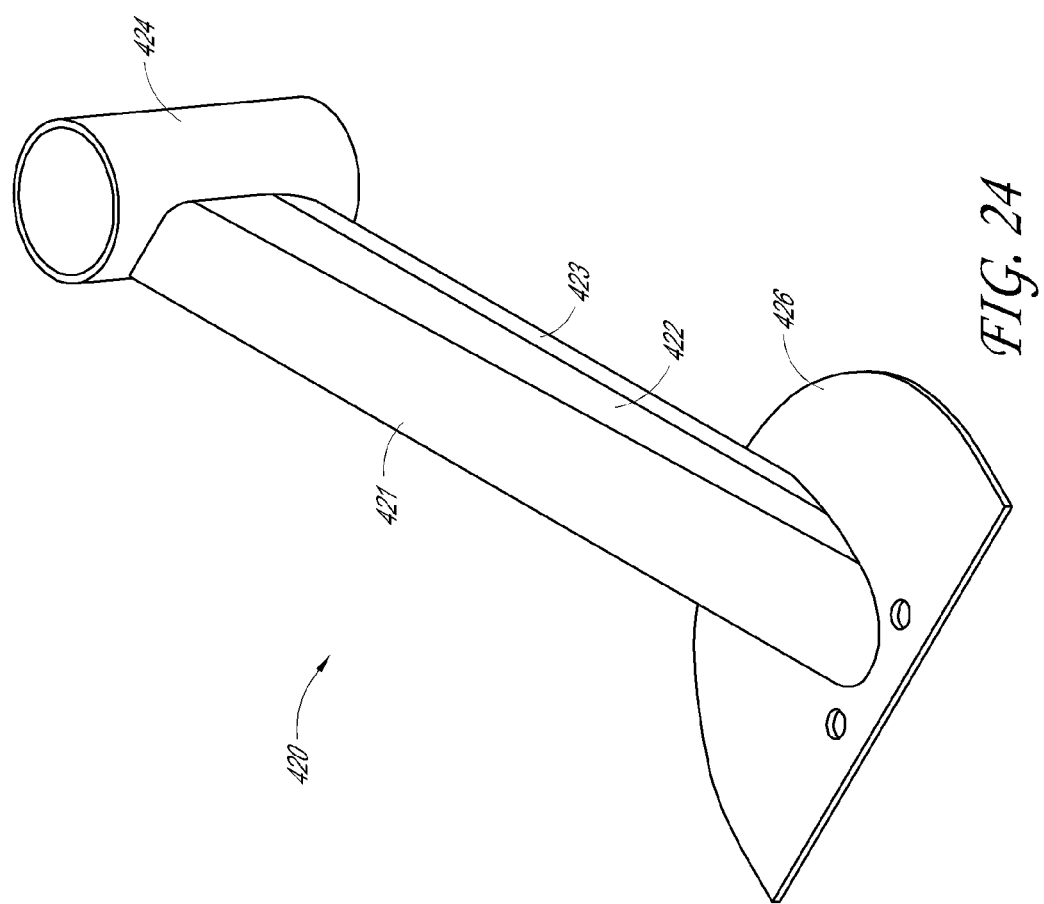
FIG. 24 is a perspective view of an embodiment of a scooter neck section.

FIGS. 24-28 generally relate to alternative embodiments of a scooter neck assembly comprising a neck and a head tube, wherein the neck comprises a generally centered arrangement in the lateral direction of the associated scooter 200. FIG. 24 illustrates a neck assembly having a singular neck member 421, which has a greater vertical dimension than its width or lateral dimension. FIGS. 25-28 illustrate an embodiment that comprises at least two tubular members connecting to the head tube 424 in a substantially centralized configuration or stacked in a vertical direction.

FIG. 24 shows a top side perspective view of a scooter neck section 420 that generally comprises a first or upper neck portion 421, a second or intermediate neck portion 422, a third or lower neck portion 423, a head tube 424, and a base section 426. The first neck portion 421 is generally rounded or semi-cylindrical (semi-circular in cross-section) in shape. The second neck portion 422 generally comprises side wall portions that connect ends of the first neck portion 421 to ends of the third neck portion 423, which is shaped similar to the first neck portion 421. In other words, the third neck portion 423 is generally rounded or semi-cylindrical (semi-circular in cross-section) in shape. The neck section 420 of FIG. 24 can securely attach the base section 426 with the head tube 424 and, due to the increased vertical dimension relative to a circular tube, can provide increased resistance to torsional flex between the deck section or base section 426 and the head tube 424.

Figure 25:
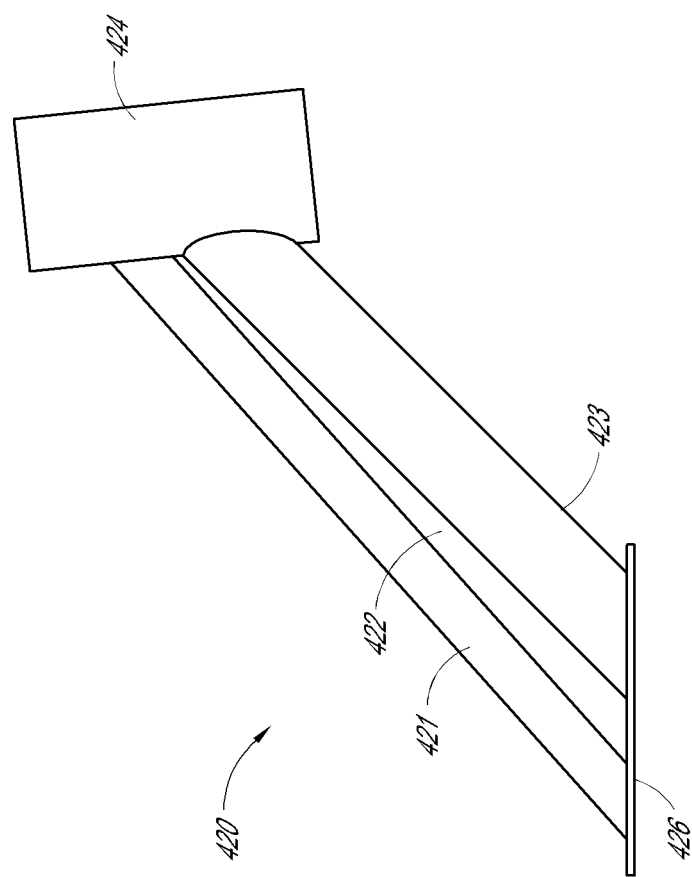
FIG. 25 is a left side view of the scooter neck section of FIG. 24.
Figure 26:
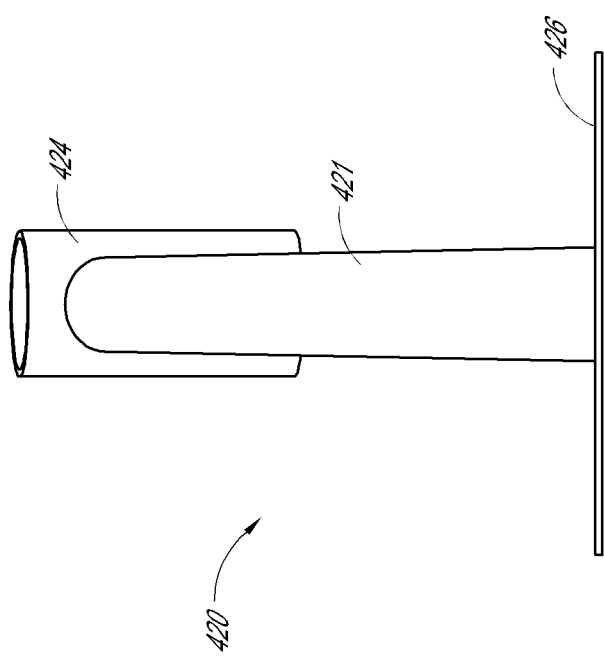
FIG. 26 is a rear view of the scooter neck section of FIG. 24.
Figure 27:
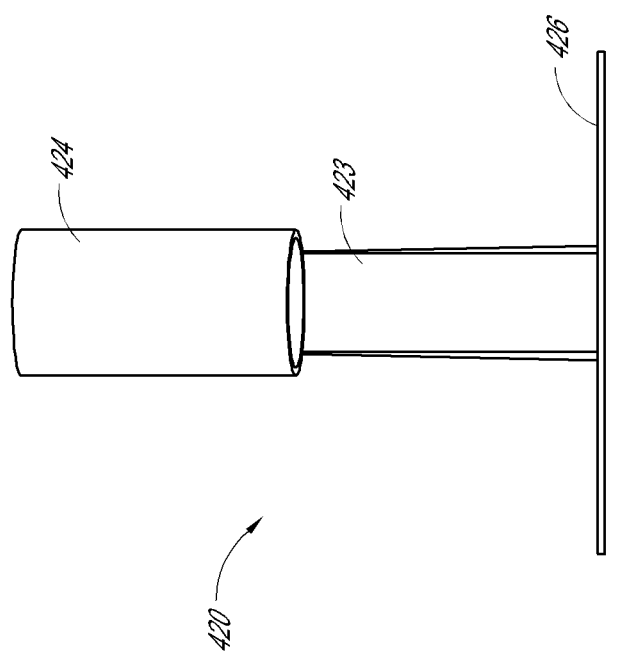
FIG. 27 is a front view of the scooter neck section of FIG. 24.
Figure 28:
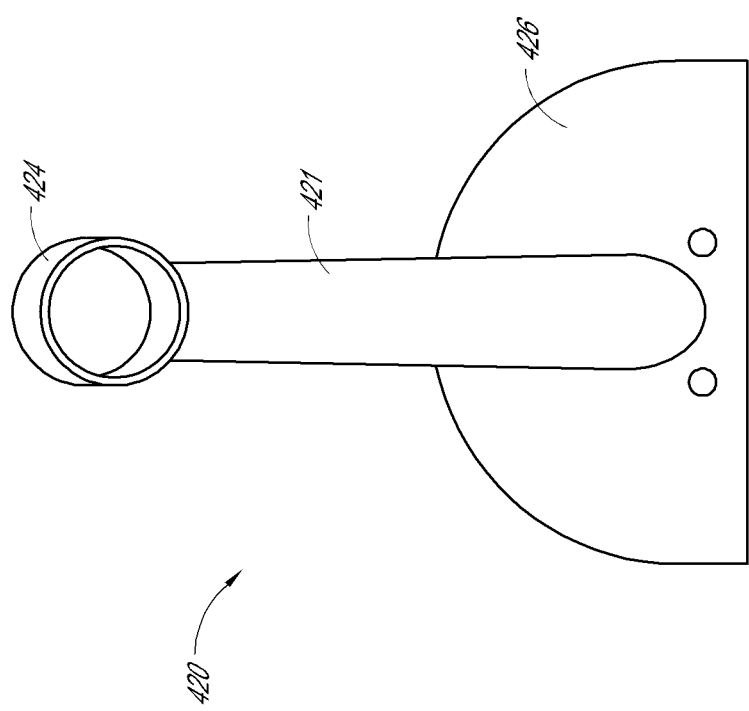
FIG. 28 is a top view of the scooter neck section of FIG. 24.

FIG. 25 shows a left side perspective view of an embodiment of a scooter neck section 420 that generally comprises a first tubular neck member 421, a space 422, a third tubular neck member 423, a head tube 424, and a base section 426. The first tubular neck member 421 and third tubular neck member 423 are separated by the space 422 and can be configured to be aligned along a midsection of the base section 426. The ends of the neck members 421, 423 connected to the head tube 424 are closer than the ends of the neck members 421, 423 connected to the base section 426. That is, the space 422 is smaller near the head tube 424 and is larger near the base section 426. Alternatively, this arrangement could be reversed or the neck members 421, 423 could be substantially parallel to one another.

FIGS. 29-32 generally relate to embodiments related to scooters comprising a deck, head tube, steer tube, and clamp assembly, wherein the clamp assembly comprises three or more bolt clamp portions. The additional bolt clamp portions advantageously provide increased clamp force and/or an increased clamp force area.

Figure 29:
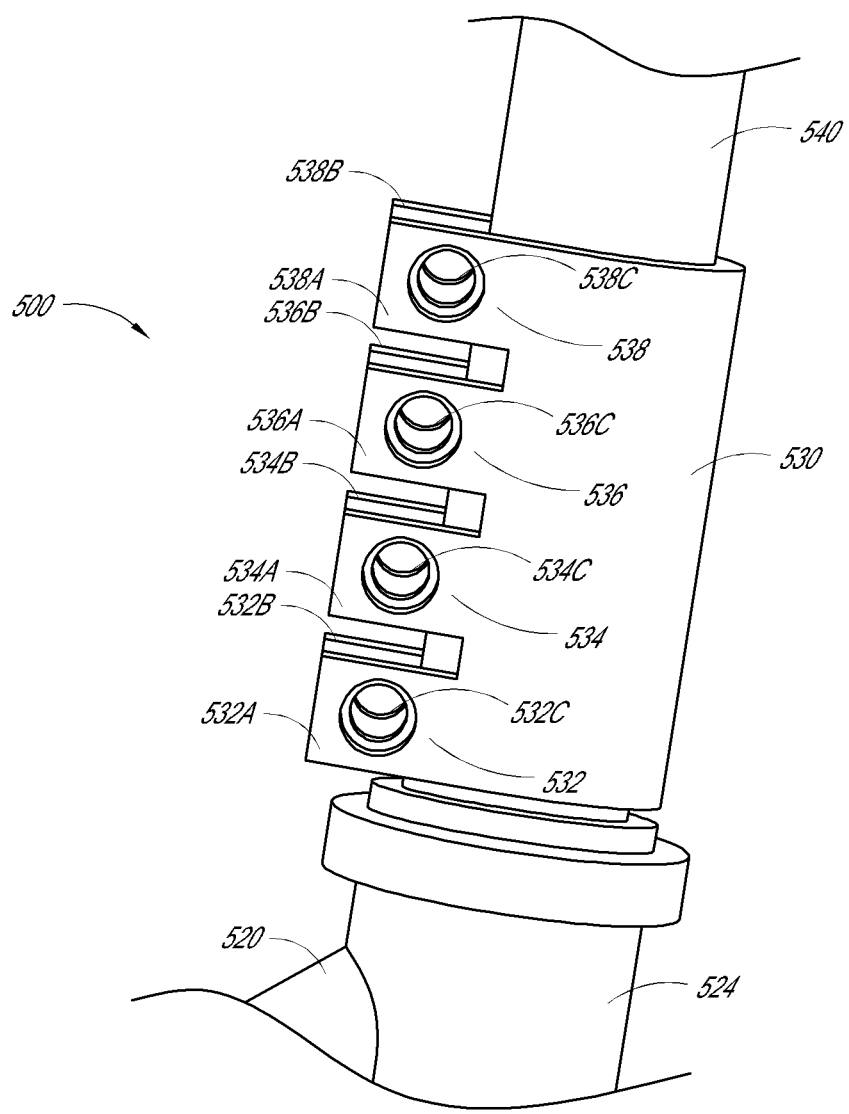
FIG. 29 is a left side view of a portion of an embodiment of a scooter assembly comprising a clamp assembly.
Figure 30:
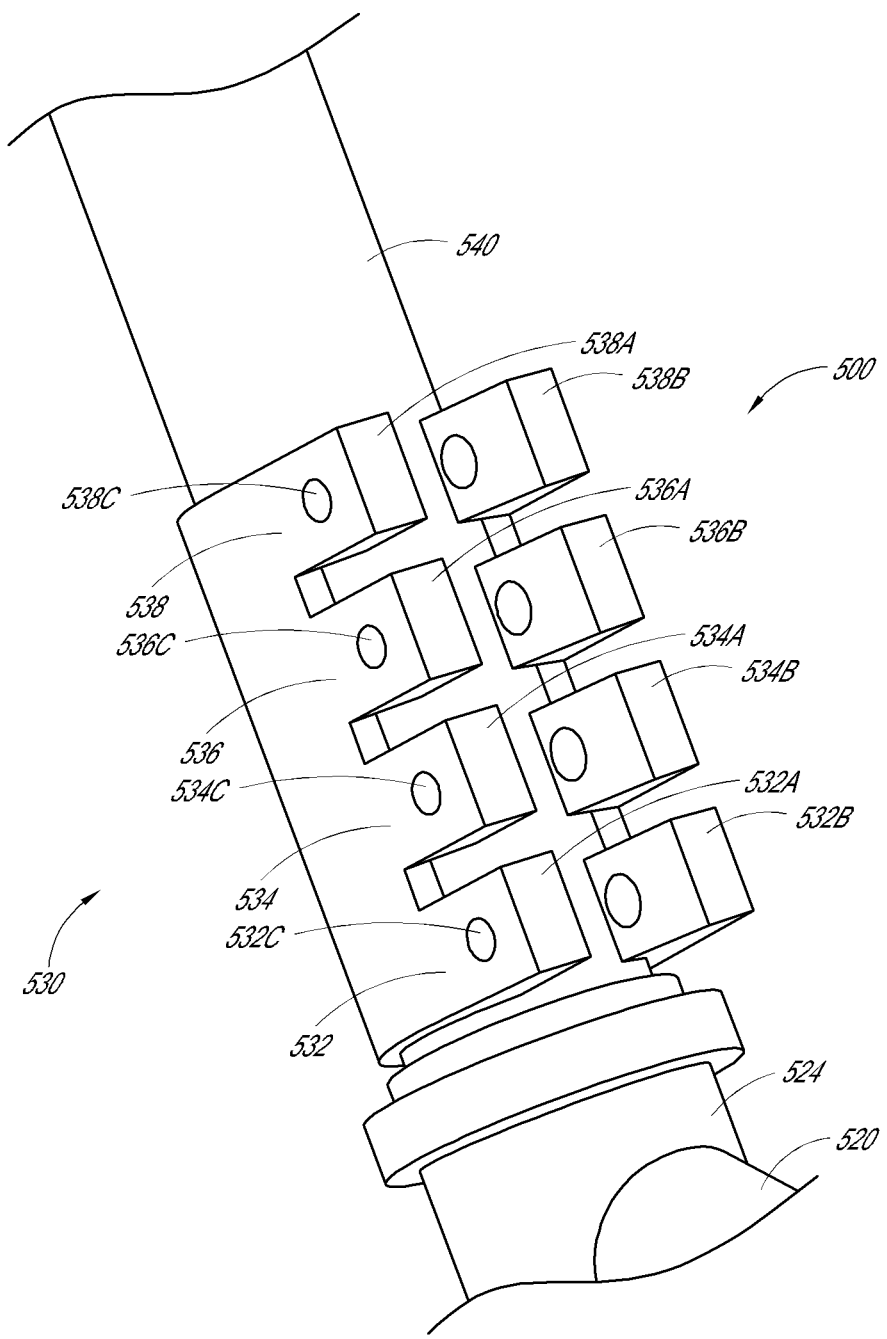
FIG. 30 is a perspective view of the portion of the scooter assembly of FIG. 29.
Figure 31:
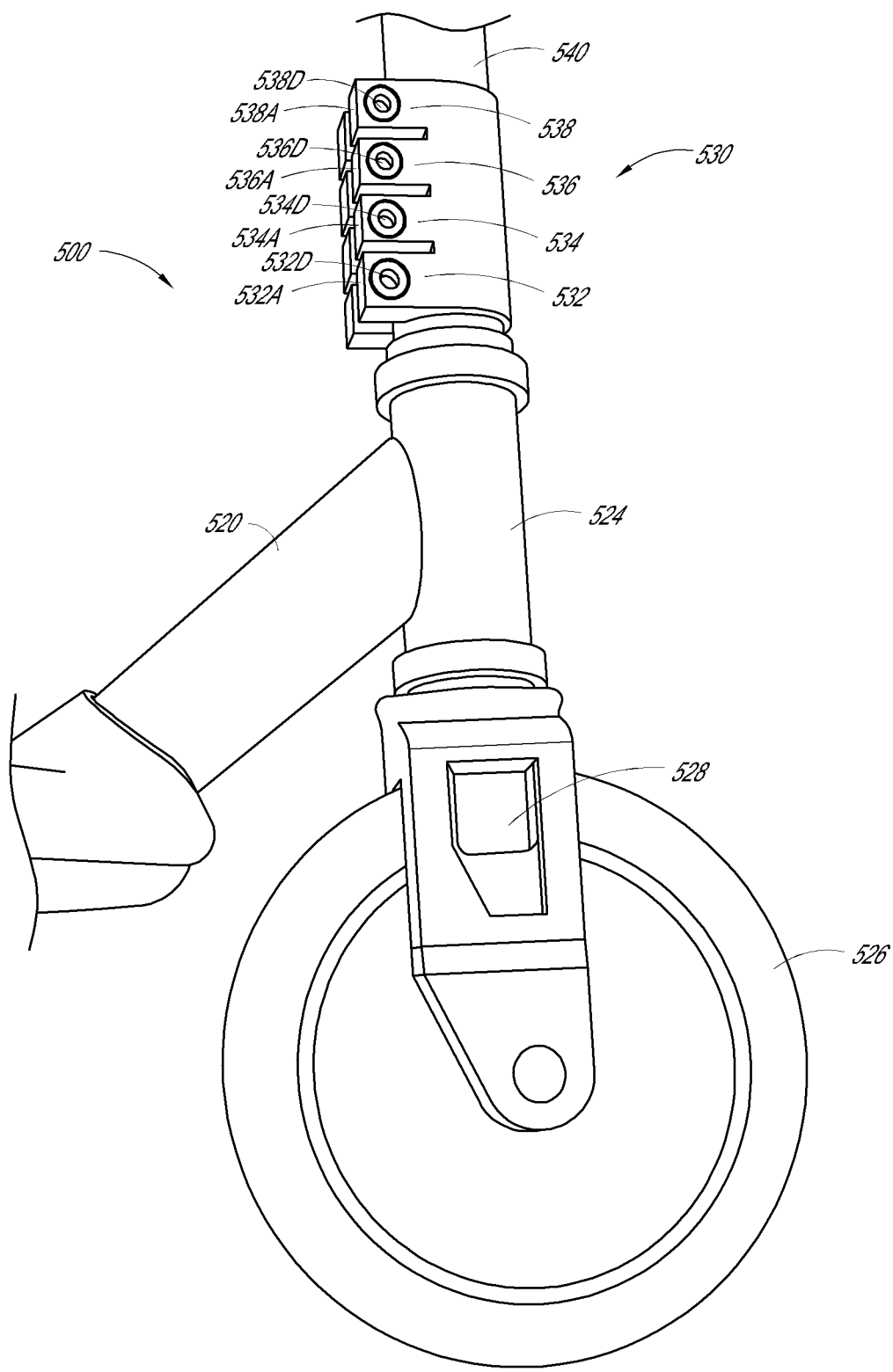
FIG. 31 is a left side view of a portion of an embodiment of a scooter assembly comprising a clamp assembly.
Figure 32:
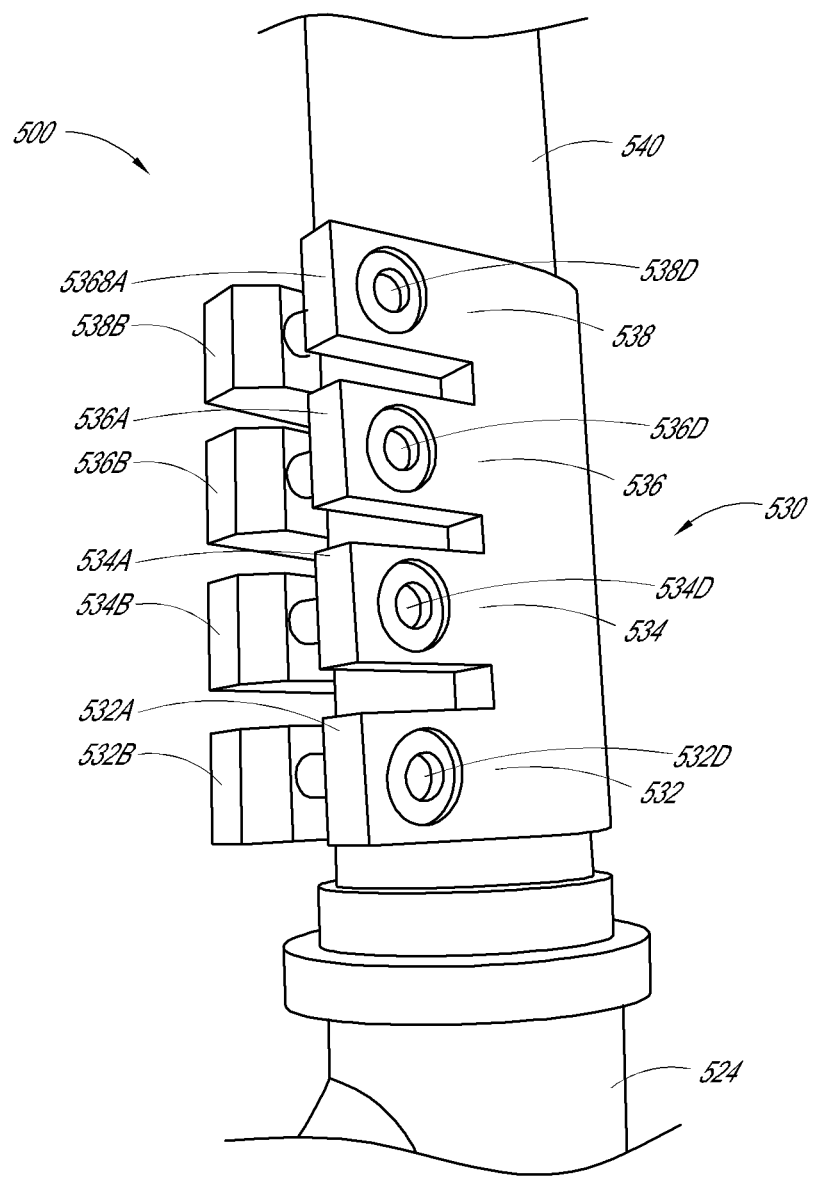
FIG. 32 is a perspective view of the portion of the scooter assembly of FIG. 31.

FIGS. 29 and 30 show an embodiment of a portion of a scooter assembly 500 that comprises a neck 520, a head tube 524, a clamp assembly 530, and a steering tube 540. The clamp assembly 530 is coupled to the steering tube 540 at or near a bottom portion of the steering tube 540 above the head tube 524 and secures the fork 528 (FIG. 31) relative to the head tube 524. FIGS. 31 and 32 show a side view of the scooter assembly 500 with clamp bolts in place in the clamp assembly 530. In some embodiments, the clamp assembly 530 comprises a first bolt section 532, a second bolt section 534, a third bolt section 536, and a fourth bolt section 538. The first bolt section 532 can comprise a first ear 532A, a second ear 532B, and an opening 532C configured to receive a bolt. The second bolt section 534 can comprise a first ear 534A, a second ear 534B, and an opening 534C configured to receive a bolt. The third bolt section 536 can comprise a first ear 536A, a second ear 536B, and an opening 536C configured to receive a bolt. The fourth bolt section 538 can comprise a first ear 538A, a second ear 538B, and an opening 538C configured to receive a bolt. The bolt sections are vertically (or axially) stacked and can be equidistant from one another. In other embodiments, the clamp assembly comprises three or less bolt sections. In other alternative embodiments, the clamp assembly can comprise five or more bolt sections. As used herein, the term bolt can include bolts, screws, or any other suitable fastening member unless otherwise indicated either explicitly or by the context of the disclosure.

Figure 33:
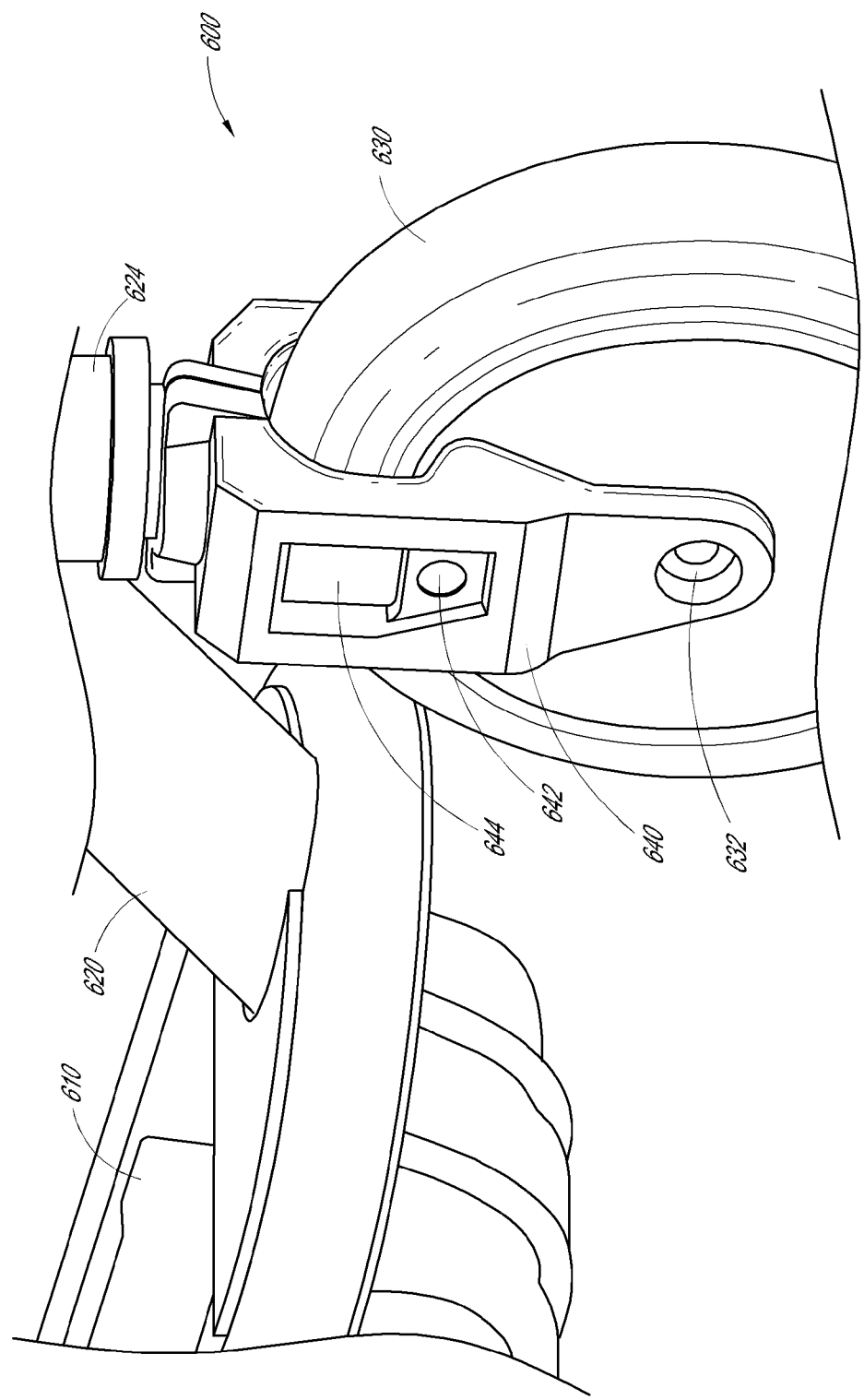
FIG. 33 is a perspective view of a portion of an embodiment of a scooter assembly comprising a front fork.
Figure 34:
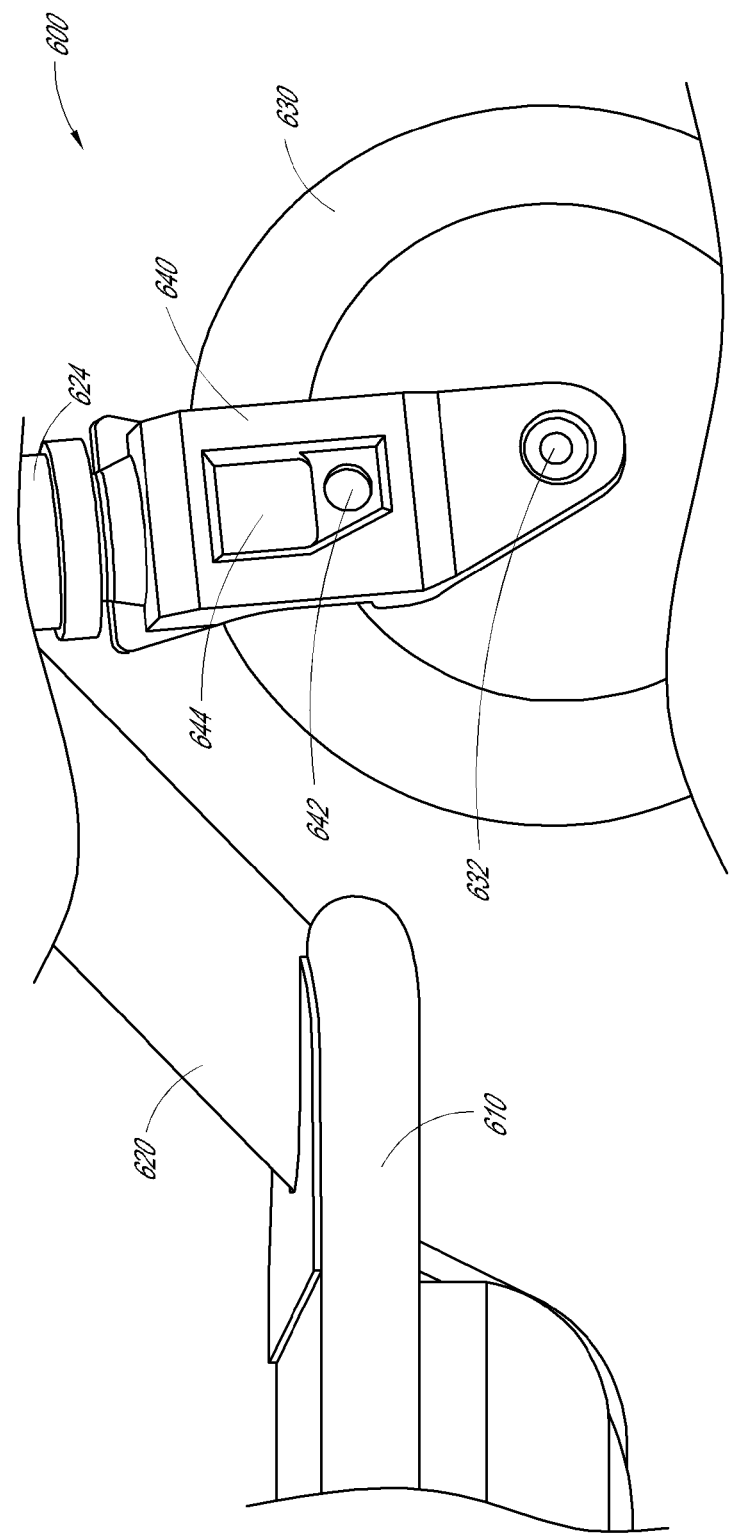
FIG. 34 is a left side view of the portion of the scooter assembly of FIG. 33.
Figure 35:
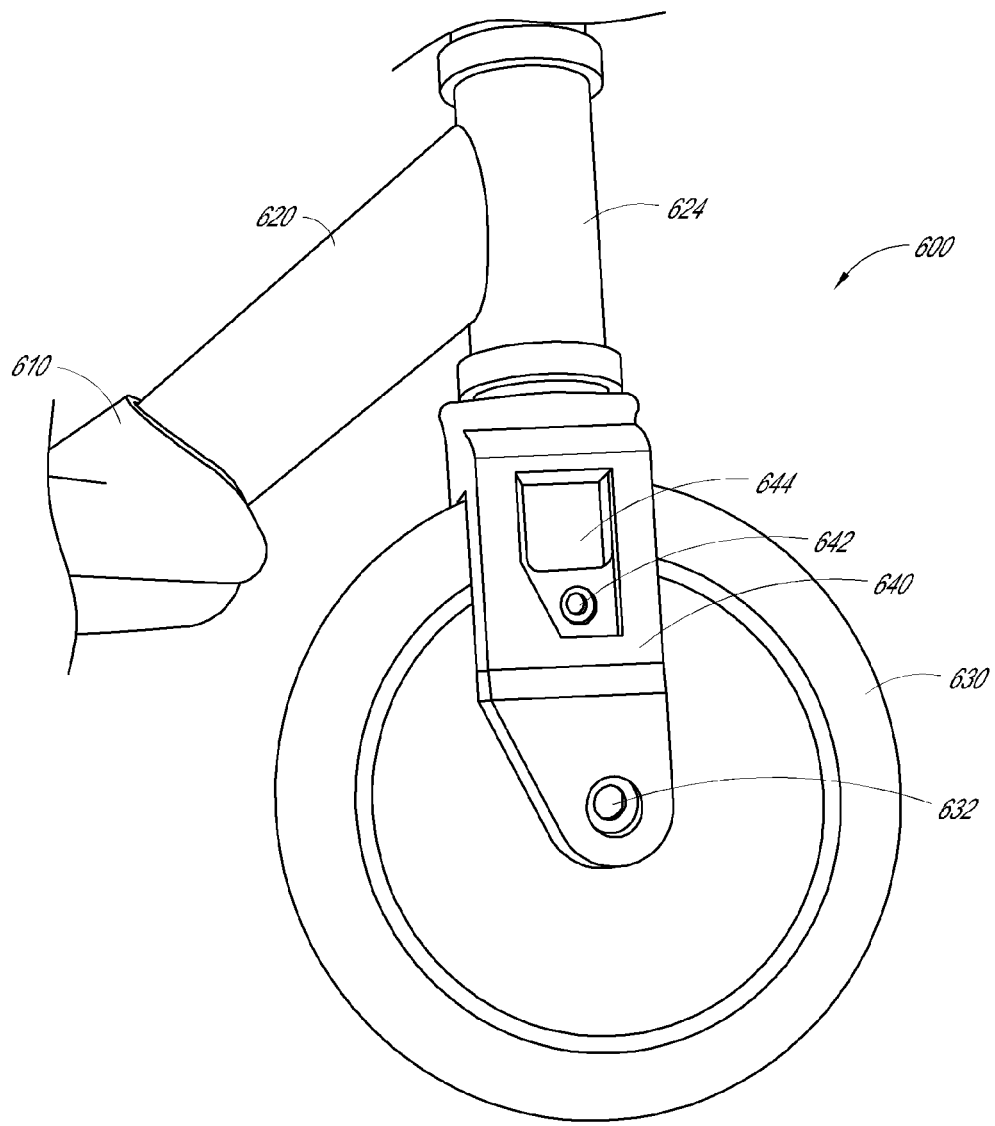
FIG. 35 is another left side view of the portion of the scooter assembly of FIG. 33.

FIGS. 33-35 generally relate to embodiments related to scooters comprising a deck, front wheel, a neck, a head tube, a steer tube, a front fork connecting the front wheel to the steer tube, and a front fork cover, wherein the front fork cover generally surrounds the front fork as a protective exterior. The illustrated scooter assembly 600 comprises a deck section 610, a neck 620, a head tube 624, a front wheel 630, and a front fork cover 640. The front fork can provide a means by which the front wheel 630 is mounted to a steering tube. In some embodiments, the front fork comprises a formed (e.g., bent) metal (e.g., steel) member, as shown, for example, in FIGS. 1, 4, 7 and 23. The front fork of FIGS. 33-35 preferably also comprises the same or a similar formed metal front fork member (partially visible through opening 644) that is partially or substantially completely enclosed by the fork cover 640. In addition, the front wheel 630 can be configured to rotate about a front-wheel axle 632.

As described, the cover 640 can be provided to cover some, a substantial portion or essentially all exterior surfaces (i.e., surfaces other than those facing the front wheel 630) of the front fork. The cover 640 can serve as a protective exterior to the front fork. In some embodiments, the cover 640 can comprise a plastic, such as a hard plastic. In other embodiments, the cover 640 can comprise metal. The cover 640 can be secured to the front fork by a fastening member 642, such as a bolt, screw or other threaded (e.g., removable) fastener. Other fastening members/arrangements (e.g., permanent or semi-permanent) could also or alternatively be used, such as rivets for example.

The fork cover 640 can comprise a pair of cover portions on each side of the front wheel 630. Front and/or rear portions of the fork cover 640 can extend towards the sides of the front wheel 630 and be shaped similarly to the front wheel 630. Thus, the fork cover 640, or cooperating cover portions, can define a cut-out or space that accommodates, but preferably closely follows, the shape of the front wheel 630 in either or both of the front and rear portions of the front fork. Such an arrangement inhibits the entry of foreign objects (e.g., small stones or pebbles) from entering into a space between the front fork and the front wheel 630. The provision of the fork cover 640 allows the underlying (e.g., structural) portion of the front fork to be a relatively simple shape, which can be suitable for forming from a bent metal work piece and, thus, be relatively inexpensive to manufacture. The fork cover 640 can be formed from, for example, a plastic material that can be made via, for example, a molding process (e.g., injection-molding) or other suitable process that permits inexpensive manufacture of more intricate shapes. Thus, the combination of the front fork and fork cover 640 provides suitable structural properties and also allows the fork assembly to closely follow the shape of the front wheel 630 in a relatively inexpensive arrangement.

In some embodiments, the cover 640 can comprise an opening 644 that allows a portion of the underlying fork structure or another underlying structure. The opening 644 can be provided for ornamental reasons or the underlying fork structure can include a protrusion that mates with the opening 644 to provide coupling of the fork cover 640 to the underlying fork structure in addition or in alternative to the fastening member 642.

Figure 36:
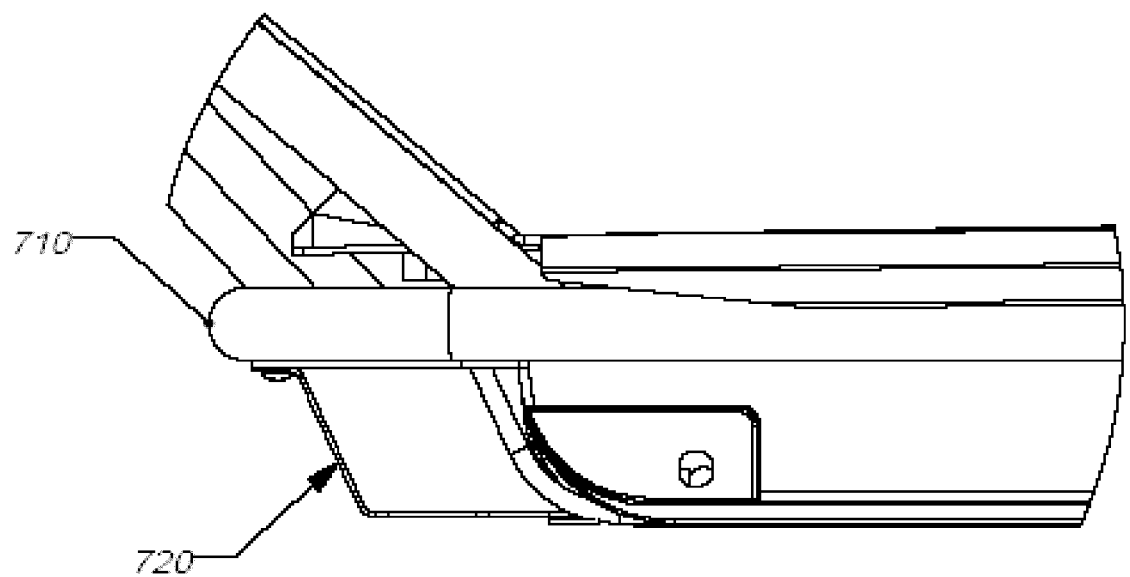
FIG. 36 is a side view of a portion of an embodiment of a scooter assembly comprising a bash guard.
Figure 37:
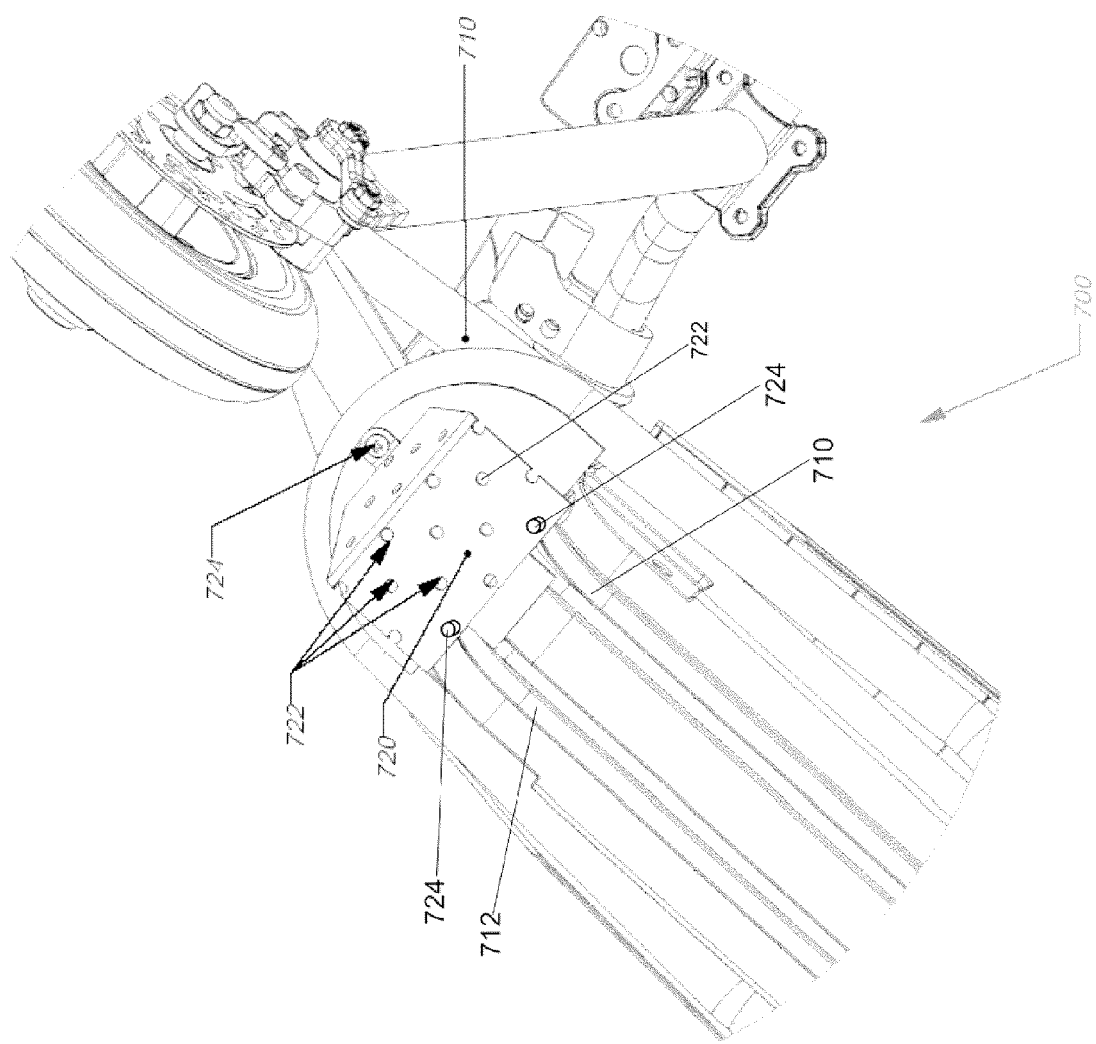
FIG. 37 is a perspective view of a bottom of the scooter assembly comprising a bash guard of FIG. 36.

FIGS. 36 and 37 generally relate to an embodiment of a scooter 700 comprising a deck, front and rear wheels, a neck, a head tube, a steer tube, and a bash guard, wherein the bash guard 720 is provided underneath the deck and can serve a protective function and/or occupy a space between the front wheel and a forward surface of a lower frame portion to facilitate the scooter sliding over obstacles that could otherwise enter into the space between the front wheel and a forward surface of a lower frame portion.

FIG. 37 shows a perspective view of the bottom of the scooter assembly 700 including the bash guard 720. The scooter assembly 700 can be of any suitable arrangement, such as shown in FIG. 1 or otherwise shown or described herein. The scooter assembly 700 can generally comprise a deck 210, a neck 220, a head tube 224, a clamp assembly 250, a steering tube 260, a front wheel 230, and a rear wheel 234. In some embodiments, the scooter assembly can be an electric scooter. In particular, an electric motor 714 as shown in FIG. 37 can be provided underneath approximately a rear portion 214 of the scooter assembly.

To protect the underside of the scooter assembly 700 and components of the scooter assembly 700, such as the electric motor 714, a bash guard 720 can be provided. In some embodiments, the bash guard 720 is provided at a location in front of the rear wheel. In preferred embodiments, the bash guard 720 can comprise a metal. In other embodiments, the bash guard 720 can comprise a hard plastic. The bash guard 720 can be an angled piece having a bottom portion and a front portion, each of which can be substantially planar in some configurations. Alternatively, the bash guard 720 can be a curved shape, preferably still having bottom and front portions. The bash guard 720 can have any suitable width, such as substantially the same width as the scooter frame. In the illustrated arrangement, the bash guard 720 is somewhat narrower than the width of the scooter frame or at least the deck section of the scooter frame.

The bash guard 720 can comprise a plurality of openings 722. The openings 722 advantageously serve many functions. For example, the openings 722 allow for weight reduction of the bash guard 720. In addition, the openings 722 provide for metal forming options to present the bash guard in a solid sheet. Also, the openings 722 allow airflow to a battery box, and provide a draining mechanism so that the scooter assembly does not retain water in wet conditions. Furthermore, the underside of the scooter assembly can comprise a first rail 710 and a second rail 712. The bash guard 720 can be fixedly attached to the first rail 710 and the second rail 712 via fastening members 724 and/or can be fixedly attached to the scooter frame (e.g., the base section 426) at or near a front portion of the bash guard 720 via a fastening member 724. Other suitable arrangements can also be used to secure the bash guard 720 to the scooter frame or other portion of the scooter 700.

Figure 38:
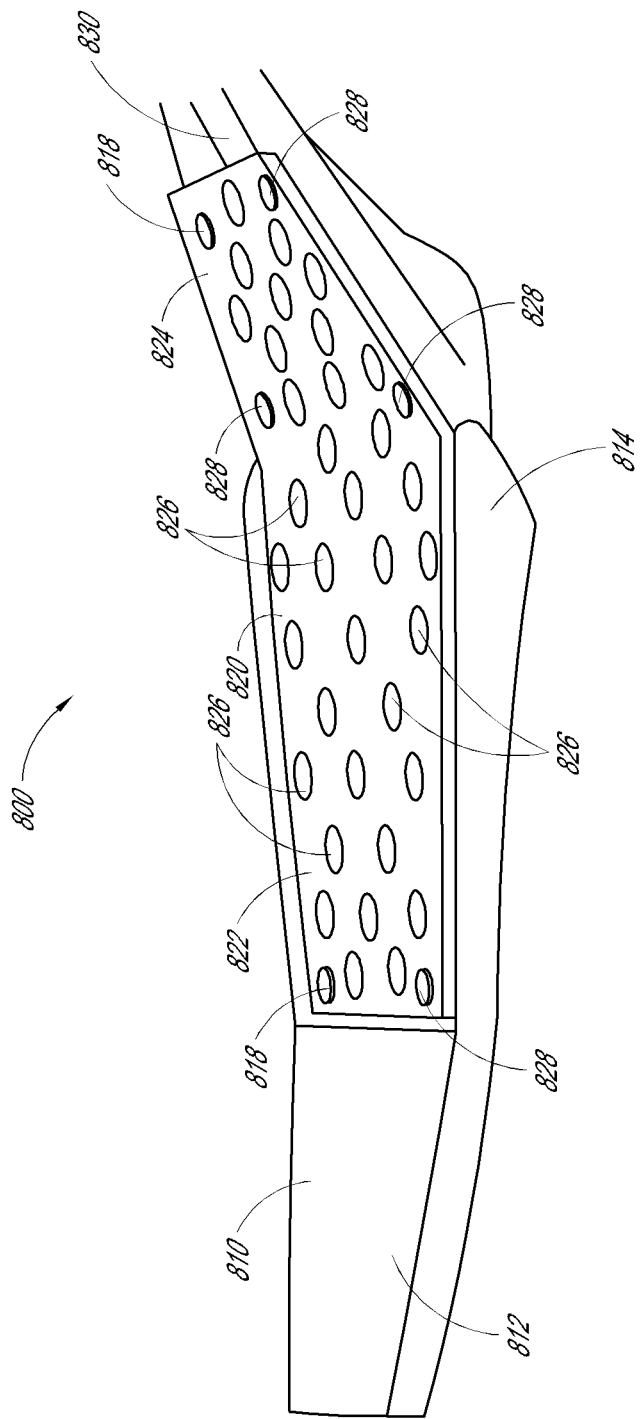
FIG. 38 is a perspective view of an embodiment of a deck assembly for a scooter assembly.

FIG. 38 generally relates to embodiments related to scooters comprising a deck, a first section on the deck comprising a first material, such as plastic, and a second section on the deck comprising a second material, such as metal (e.g., steel or aluminum). In some configurations, the first section and the second section can comprise the same or different materials, but can be configured to provide different frictional and/or ornamental features. For example, one section can have a relatively smooth deck surface and the other section can have a non-smooth deck surface, which can include grip features, rough surface portions or openings (which can be void or occupied by another member), for example.

FIG. 38 shows a perspective view of an embodiment of a deck assembly 800 for a scooter assembly. In particular, the deck assembly 800 can comprise a first deck portion 810 and a second deck portion 820. In some embodiments, the first deck portion 810 comprises a type of plastic and the second deck portion 820 comprises metal. In alternative embodiments, the first deck portion 810 can comprise any plastic, metal, or other suitable material, and the second deck portion 820 can comprise any plastic, metal, or other suitable material, which can be the same as or different from the material of the first deck portion.

The first deck portion 810 can comprise a rear first deck portion 812 and a front first deck portion 814, and the second deck portion 820 can comprise a rear second deck portion 822 and a front second deck portion 824. The first deck portion 810 can be arranged such that the rear first deck portion 812 is uncovered by the second deck portion 820, but the front first deck portion 814 is at least partially covered by the rear second deck portion 822 of the second deck portion 820. In the illustrated arrangement, lateral side portions of the first deck portion 814 are uncovered and extend along opposite sides of the second deck portion 820 (e.g., the rear second deck portion 822). The front second deck portion 824 of the second deck portion 820 can extend up a neck portion 830 of the scooter assembly. The first deck portion 810 and/or the second deck portion 820 can be securely fixed to the deck assembly 800 via fastening members 828 or other suitable fastening arrangements.

The second deck portion 820 can comprise a plurality of openings 826. In addition, an insert comprising a gripping material, such as rubber or a rubber-like material, can be provided between the second deck portion 820 and the first deck portion 810. Furthermore, portions of a rubber insert can be configured to protrude through the openings 826 of the second deck portion 820. Such portions of the rubber insert can be substantially even with the deck surface of the second deck portion 820 surrounding the openings 826 or can protrude so as to be raised above the deck surface of the second deck portion 820 surrounding the openings 826. As such, the second deck portion 820 can provide a surface that can deliver improved gripping ability to a rider of the scooter assembly. In addition, a rider can recognize a difference in surface texture between the first deck portion 810 and the second deck portion 820, preferably by feel and without looking at the deck surface.

Figure 39:
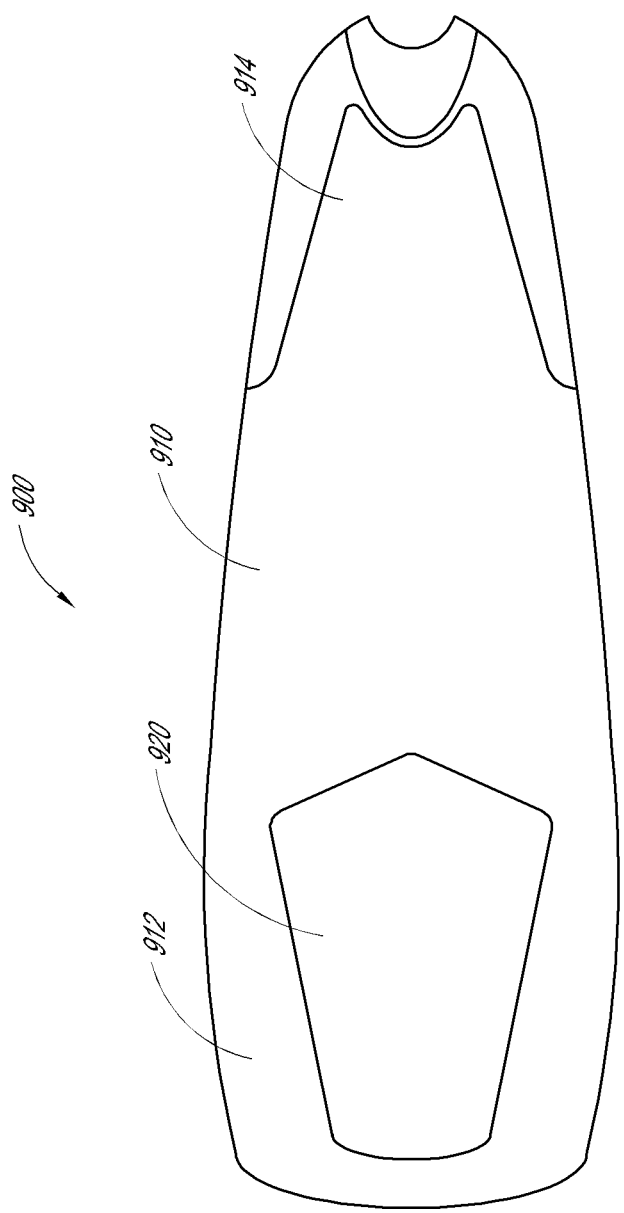
FIG. 39 is a top view of another embodiment of a deck assembly for a scooter assembly.

FIG. 39 generally relates to embodiments related to scooters comprising a deck, a first section on the deck comprising a material (e.g., plastic) configured to provide a first level of traction or frictional characteristics, and a second section on the deck comprising the same material (e.g., plastic) and configured to provide a second level of traction or frictional characteristics (e.g., coefficient of friction).

FIG. 39 shows a top view of an embodiment of a deck assembly 900 for a scooter assembly. In particular, the deck assembly 900 can comprise a first deck portion 910 and a second deck portion 920. In preferred embodiments, the first deck portion 910 comprises a type of plastic having a first surface texture and the second deck portion 920 comprises a type of plastic having a second surface texture. In alternative embodiments, the first deck portion 910 can comprise any plastic, metal, or other suitable material having a first surface texture, and the second deck portion 920 can comprise any plastic, metal, or other suitable material having a second surface texture. In some embodiments, the first surface texture and second surface texture are different such that the deck assembly 900 is provided with different modular grip surfaces. The different modular grip surfaces can assist a scooter rider in locating various positions of the deck assembly 900 by feeling the texture of the deck assembly surface with the scooter rider's feet. In alternative arrangements, different materials can be used for the different portions 910, 920.

In different embodiments, the relative location of the first deck portion 910 and the second deck portion 920 can vary. For example, as shown in FIG. 39, the first deck portion 910 comprises a rear first deck portion 912 and a front first deck portion 914. The second deck portion 920 can be situated in proximity to the rear first deck portion 912. In alternative embodiments, the second deck portion can be situated in proximity to any other part of the first deck portion 910, including the front first deck portion 914 and a center part of the first deck portion 910. In other alternative embodiments, the deck assembly can comprise three or more deck portions, each of which can have the same or different surface texture of any of the other deck portions, thereby assisting a scooter rider in locating any section of the deck assembly by feeling the texture of the deck assembly with the scooter rider's feet.

In some embodiments, the second deck portion 920 can function as a foot brake. For example, in some scooter assembly embodiments, such as described in connection with FIG. 1, the scooter assembly comprises a foot brake formed as a part of a rear portion of the deck assembly. A rear portion of the deck assembly can be configured to pivot about an axis to provide a braking pressure to a rear wheel. By providing a second deck portion 920 with a differently textured surface, a scooter rider can be assisted in easily locating the foot brake. A second deck portion 920 with a differently textured surface can also assist a scooter rider in differentiating between the foot brake and the rest of the deck assembly in order to avoid inadvertent pressing of the foot brake.

The features and attributes of the specific embodiments disclosed above may be combined in different ways to form additional embodiments, all of which fall within the scope of the present disclosure. Although this invention has been described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. An electric scooter comprising:
a deck configured to support a rider;
a front wheel and a rear wheel;
a handlebar assembly comprising a handlebar, a left handle, and a right handle;
a steering column comprising a steering tube and the handlebar assembly, the steering column configured to steer the scooter by controlling a direction of the front wheel; and
an electric motor configured to provide mechanical power to at least one of the front and the rear wheels;
wherein the steering column is configured to be detachable from an associated portion of the scooter and comprises one or more rechargeable battery packs, the one or more rechargeable battery packs configured to power the electric motor;
wherein the steering column comprising the one or more rechargeable battery packs is configured to be placed into a charger for charging of the one or more rechargeable battery packs.

2. The electric scooter of claim 1, wherein the left and right handles are configured to be separately detachable, and the left handle and right handle each comprises at least one of the one or more rechargeable battery packs.

3. The electric scooter of claim 2, wherein the one or more battery rechargeable packs comprise lithium-ion rechargeable batteries.

4. An electric scooter comprising:
a deck configured to support a rider;
a front wheel and a rear wheel;
a handlebar assembly comprising a handlebar, a left handle, and a right handle;
a steering column comprising a steering tube and the handlebar assembly, the steering column configured to steer the scooter by controlling a direction of the front wheel;
an electric motor configured to provide mechanical power to at least one of the front and the rear wheels;
wherein the left and right handles are configured to be separately detachable, and the left handle and right handle each comprise one or more rechargeable battery packs configured to power the electric motor;
wherein the left and right handles are configured to be interchangeable with each other such that the left handle can be detached, recharged, and reattached as a left or right handle and the right handle can be detached, recharged, and reattached as a left or right handle;
wherein the one or more rechargeable battery packs of the left and right handles are configured to be recharged by placing the handle in a recharging station configured to receive the handle.

5. An electric scooter comprising:
a deck configured to support a rider;
a front wheel and a rear wheel;
a handlebar assembly comprising a handlebar, a left handle, and a right handle;
a steering column comprising a steering tube and the handlebar assembly, the steering column configured to steer the scooter by controlling a direction of the front wheel;
an electric motor configured to provide mechanical power to at least one of the front and the rear wheels;
wherein the left and right handles are configured to be separately detachable, and the left handle and right handle each comprise one or more rechargeable battery packs configured to power the electric motor;
wherein the left and right handles are configured to be interchangeable with each other such that the left handle can be detached, recharged, and reattached as a left or right handle and the right handle can be detached, recharged, and reattached as a left or right handle;
wherein the left and right handles are each configured to attach to the handlebar through a snap-on mechanism.

6. An electric scooter comprising:
a deck configured to support a rider;
a front wheel and a rear wheel;
a handlebar assembly comprising a handlebar, a left handle, and a right handle;
a steering column comprising a steering tube and the handlebar assembly, the steering column configured to steer the scooter by controlling a direction of the front wheel;
an electric motor configured to provide mechanical power to at least one of the front and the rear wheels;
wherein the handlebar assembly is configured to be detachable and comprises one or more rechargeable battery packs configured to power the electric motor;
wherein the detachable handlebar assembly is configured to attach to the steering tube through a snap-on mechanism.

7. An electric scooter comprising:
a deck configured to support a rider;
a front wheel and a rear wheel;
a handlebar assembly comprising a handlebar, a left handle, and a right handle;
a steering column comprising a steering tube and the handlebar assembly, the steering column configured to steer the scooter by controlling a direction of the front wheel; and
an electric motor configured to provide mechanical power to at least one of the front and the rear wheels;
wherein the left handle, the right handle, the handlebar and the steering tube are configured to be separately detachable from an associated portion of the scooter and each comprises at least one of the one or more rechargeable battery packs, the one or more rechargeable battery packs configured to power the electric motor;
wherein each of the left handle, the right handle, the handlebar and the steering tube comprising the one or more rechargeable battery packs is configured to be placed into a charger for charging of the one or more rechargeable battery packs.

* * * * *